US011928437B2

United States Patent
Galitsky

(10) Patent No.: US 11,928,437 B2
(45) Date of Patent: Mar. 12, 2024

(54) MACHINE READING BETWEEN THE LINES

(71) Applicant: Oracle International Corporation, Redwood Shores, CA (US)

(72) Inventor: Boris Galitsky, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 320 days.

(21) Appl. No.: 17/568,527

(22) Filed: Jan. 4, 2022

(65) Prior Publication Data
US 2022/0245360 A1 Aug. 4, 2022

Related U.S. Application Data

(60) Provisional application No. 63/144,704, filed on Feb. 2, 2021.

(51) Int. Cl.
| | |
|---|---|
| *G06F 40/35* | (2020.01) |
| *G06F 16/33* | (2019.01) |
| *G06F 16/332* | (2019.01) |
| *G06F 16/36* | (2019.01) |
| *G06F 40/284* | (2020.01) |

(Continued)

(52) U.S. Cl.
CPC .......... *G06F 40/35* (2020.01); *G06F 16/3329* (2019.01); *G06F 16/3344* (2019.01); *G06F 16/36* (2019.01); *G06F 40/284* (2020.01); *G06F 40/289* (2020.01); *G06F 40/30* (2020.01)

(58) Field of Classification Search
CPC ...... G06F 40/35; G06F 40/284; G06F 40/289; G06F 40/30; G06F 16/3329; G06F 16/3344
See application file for complete search history.

(56) References Cited

U.S. PATENT DOCUMENTS

| | | |
|---|---|---|
| 10,114,816 B1 | 10/2018 | Srivastava et al. |
| 10,248,721 B2 | 4/2019 | Pitsos |
| 10,733,654 B2 | 8/2020 | Jadhav et al. |

(Continued)

OTHER PUBLICATIONS

Better Language Models and their Implications, OpenAI, Available Online at: https://openai.com/blog/better-language-models/, Feb. 14, 2019, 11 pages.

(Continued)

*Primary Examiner* — Samuel G Neway
(74) *Attorney, Agent, or Firm* — Kilpatrick Townsend & Stockton LLP

(57) ABSTRACT

Techniques for identifying one or more missing fragments within input text are disclosed. A discourse tree (DT) is generated for the input text (IT) received, the IT having any suitable number of sentence fragments. An indication that the IT is likely missing one or more sentence fragments may be identified based on determining that one or more rhetorical relationships of the DT matches one of a set of predefined rhetorical relationships. A query is generated one or more sentence fragments of the IT and executed against a knowledge base to obtain a set of search results. A most-relevance search result can be utilized to identify a set of candidate sentence fragments. A subset of those candidate sentence fragments can be identified based on comparing them to the sentence fragments provided in the IT, each candidate sentence fragment of the subset being implied but excluded from the IT.

20 Claims, 9 Drawing Sheets

(51) Int. Cl.
G06F 40/289 (2020.01)
G06F 40/30 (2020.01)

(56) References Cited

U.S. PATENT DOCUMENTS

| | | |
|---|---|---|
| 10,839,154 B2 | 11/2020 | Galitsky |
| 10,951,560 B1 | 3/2021 | Jain et al. |
| 11,057,322 B1 | 7/2021 | Jain et al. |
| 11,132,993 B1 | 9/2021 | Mcdaniel et al. |
| 2010/0332475 A1 | 12/2010 | Birdwell et al. |
| 2013/0110498 A1 | 5/2013 | Bekkerman |
| 2018/0174220 A1 | 6/2018 | Jadhav et al. |
| 2018/0218731 A1 | 8/2018 | Gustafson et al. |
| 2018/0293241 A1 | 10/2018 | Chittar et al. |
| 2018/0329880 A1* | 11/2018 | Galitsky ............... G06F 40/211 |
| 2018/0357220 A1* | 12/2018 | Galitsky ................ G06F 40/30 |
| 2018/0357221 A1* | 12/2018 | Galitsky ............... G06F 40/289 |
| 2019/0005089 A1 | 1/2019 | Kempf et al. |
| 2019/0138595 A1* | 5/2019 | Galitsky ................ G06F 40/35 |
| 2019/0205390 A1 | 7/2019 | Fang et al. |
| 2019/0236085 A1* | 8/2019 | Galitsky ............... G06N 5/022 |
| 2019/0304157 A1 | 10/2019 | Amer et al. |
| 2019/0325069 A1 | 10/2019 | Santos et al. |
| 2019/0347297 A1* | 11/2019 | Galitsky ................ G06F 40/49 |
| 2019/0354805 A1 | 11/2019 | Hind et al. |
| 2020/0004813 A1* | 1/2020 | Galitsky ................ G06F 40/30 |
| 2020/0065220 A1 | 2/2020 | Sobran et al. |
| 2020/0073938 A1 | 3/2020 | Losalka et al. |
| 2020/0334568 A1 | 10/2020 | Liden et al. |
| 2021/0006576 A1 | 1/2021 | Juliato et al. |
| 2021/0019635 A1 | 1/2021 | Wolf et al. |
| 2021/0049503 A1 | 2/2021 | Nourian et al. |
| 2021/0287260 A1 | 9/2021 | Cheah et al. |
| 2022/0245360 A1* | 8/2022 | Galitsky ................ G06F 40/35 |

OTHER PUBLICATIONS

Bernardy et al., What Kind of Natural Language Inference are NLP Systems Learning: Is this Enough? Proceedings of the 11th International Conference on Agents and Artificial Intelligence (ICAART), Feb. 2019, pp. 919-931.

Bordes et al., Learning End-To-End Goal-Oriented Dialog, Available online at: https://arxiv.org/abs/1605.07683, Mar. 2017, 15 pages.

Branavan et al., Reading between the Lines: Learning to Map High-Level Instructions to Commands, Proceedings of the 48th Annual Meeting of the Association for Computational Linguistics, Jul. 2010, pp. 1268-1277.

Galitsky, Discourse Level Dialogue Management, Developing Enterprise Chatbots, Apr. 5, 2019, pp. 365-426.

Galitsky, Reasoning and Simulation of Mental Attitudes of a Customer, Artificial Intelligence for Customer Relationship Management: Solving Customer Problems, 2021, pp. 371-428.

Galitsky, Truth, Lie and Hypocrisy, Artificial Intelligence for Customer Relationship Management: Solving Customer Problems , 2021, pp. 223-287.

Mitchell, Reading the Web: A Breakthrough Goal for AI, AI Magazine, 2005, 1 page.

Chandu et al., Reading Between the Lines: Exploring Infilling in Visual Narratives, Proceedings of the Conference on Empirical Methods in Natural Language Processing (EMNLP), Nov. 2020, pp. 1220-1229.

Clark et al., Think you have Solved Question Answering? Try ARC, the AI2 Reasoning Challenge, arXiv:1803.05457, Available Online at: https://arxiv.org/pdf/1803.05457.pdf, 2018, 10 pages.

Cooper et al., Using the Framework, Framework for Computational Semantics LRE 62-051, Jan. 1996, 170 pages.

Demszky et al., Transforming Question Answering Datasets into Natural Language Inference Datasets, arXiv:1809.02922, Available Online at: https://arxiv.org/pdf/1809.02922.pdf, 2018, 11 pages.

Elmessiry et al., Triaging Patient Complaints: Monte Carlo Cross-Validation of Six Machine Learning Classifiers, JMIR Medical Informatics, vol. 5, No. 3, Jul. 31, 2017.

Falke et al., Ranking Generated Summaries by Correctness: An Interesting but Challenging Application for Natural Language Inference, In Proceedings of the 57th Annual Meeting of the Association for Computational Linguistics, Jul. 2019, pp. 2214-2220.

Fan et al., Strategies for Structuring Story Generation, Proceedings of the 57th Annual Meeting of the Association for Computational Linguistics, Jul. 28-Aug. 2, 2019, pp. 2650-2660.

Galitsky et al., Chatbot with a Discourse Structure-Driven Dialogue Management, Proceedings of the Software Demonstrations of the 15th Conference of the European Chapter of the Association for Computational Linguistics, Apr. 3-7, 2017, pp. 87-90.

Galitsky et al., Inferring the Semantic Properties of Sentences by Mining Syntactic Parse Trees, Data & Knowledge Engineering, vol. 81, Nov. 2012, 44 pages.

Galitsky, Machine Learning of Syntactic Parse Trees for Search and Classification of Text, Engineering Applications of Artificial Intelligence, vol. 26, No. 3, Mar. 2013, pp. 1072-1091.

Galitsky, Matching Parse Thickets for Open Domain Question Answering, Data & Knowledge Engineering, vol. 107, Jan. 2017, pp. 24-50.

Galitsky et al., Matching Sets of Parse Trees for Answering Multi-Sentence Questions, Proceedings of Recent Advances in Natural Language Processing, Sep. 2013, pp. 285-293.

Galitsky et al., On a Chatbot Conducting Dialogue-in-Dialogue, Proceedings of the 20th Annual SIGdial Meeting on Discourse and Dialogue, Sep. 11-13, 2019, pp. 118-121.

Galitsky et al., On a Chatbot Conducting Virtual Dialogues, CIKM '19: Proceedings of the 28th ACM International Conference on Information and Knowledge Management, vol. 4, Nov. 3, 2019, pp. 2925-2928.

Galitsky et al., Using Generalization of Syntactic Parse Trees for Taxonomy Capture on the Web, Proceedings of the 19th International Conference on Conceptual Structures for Discovering Knowledge, Jul. 2011, pp. 104-117.

Geiger et al., Stress-testing Neural Models of Natural Language Inference with Multiply-Quantified Sentences, arXiv:1810.13033, Available Online at: https://arxiv.org/pdf/1810.13033.pdf, 2018, 6 pages.

Glockner et al., Breaking NLI Systems with Sentences that Require Simple Lexical Inferences, arXiv:1805.02266, Available Online at: https://arxiv.org/pdf/1805.02266.pdf, 2018, pp. 650-655.

Hwang et al., COMET-ATOMIC 2020: On Symbolic and Neural Commonsense Knowledge Graphs, arXiv:2010.05953, Available Online at: https://arxiv.org/pdf/2010.05953.pdf, 2021, 19 pages.

Ilvovsky et al., Controlling Chat Bot Multi-Document Navigation with the Extended Discourse Trees, 4th International Conference on Computational Linguistics in Bulgaria (CLIB), Jun. 2020, 9 pages.

Kapanipathi et al., Infusing Knowledge into the Textual Entailment Task using Graph Convolutional Networks, Proceedings of the AAAI Conference on Artificial Intelligence, vol., No. 3405, Apr. 2020, pp. 8074-8081.

Kaplan, Read Between the Lines: Understanding Clinical Studies, Winter, vol. 18, No. 1, Feb. 16, 2019, 13 pages.

Lai et al., Learning to Predict Denotational Probabilities for Modeling Entailment, Proceedings of the 15th Conference of the European Chapter of the Association for Computational Linguistics: vol. 1, Long Papers, Apr. 2017, pp. 721-730.

Lamprell et al., Reading Between the Lines: A Five-Point Narrative Approach to Online Accounts of Illness, Journal of Medical Humanities, vol. 40, No. 4, Dec. 2019, pp. 569-590.

Lenat, CYC: A Large-Scale Investment in Knowledge Infrastructure, Communications of the ACM, vol. 38, No. 11, Nov. 1995, pp. 33-38.

Makhalova et al., FCA-Based Approach for Query Refinement in IR-Chatbots, 18th Russian Conference, RCAI, Oct. 10-16, 2020, 13 pages.

Michael, Learning from Partial Observations, International Joint Conference on Artificial Intelligence (IJCAI), 2007, 7 pages.

(56) References Cited

OTHER PUBLICATIONS

Naik et al., Stress Test Evaluation for Natural Language Inference, In Proceedings of the 27th International Conference on Computational Linguistics, 2018, pp. 2340-2353.
Pearl, On the Interpretation of do(x), UCLA Cognitive Systems Laboratory, Technical Report R-486, Feb. 2019, pp. 1-9.
Radford et al., Language Models are Unsupervised Multitask Learners, Available Online at: https://d4mucfpksywv.cloudfront.net/better-language-models/language_models_are_unsupervised_multitask_learners.pdf, 2019, 24 pages.
Richardson et al., Probing Natural Language Inference Models through Semantic Fragments, Proceedings of the AAAI Conference on Artificial Intelligence, 2019, pp. 8713-8721.
Saha et al., ConjNLI: Natural Language Inference Over Conjunctive Sentences, arXiv:2010.10418, Available Online at: https://arxiv.org/pdf/2010.10418.pdf, 2020, 14 pages.
Salvatore et al., A Logical-based Corpus for Cross-lingual Evaluation, arXiv:1905.05704, Available Online at: https://arxiv.org/pdf/1905.05704.pdf, May 10, 2019, 9 pages.
Shalyminov et al., Challenging Neural Dialogue Models with Natural Data: Memory Networks Fail on Incremental Phenomena, arXiv:1709.07840, Available Online at: https://arxiv.org/pdf/1709.07840.pdf, 2017, 9 pages.
Trivedi et al., Repurposing Entailment for Multi-hop Question Answering Tasks, In Proceedings of the North American Chapter of the Association for Computational Linguistics: Human Language Technologies, 2019, pp. 2948-2958.
Valiant, A Theory of the Learnable, Communications of the ACM, vol. 27, No. 11, Nov. 1984, pp. 1134-1142.
Valiant, Knowledge Infusion, AAAI, Available Online at: https://people.seas.harvard.edu/~valiant/AAAI06.pdf, 2006, pp. 1546-1551.
Vendrov et al., Order-embeddings of Images and Language, In Proceedings of the International Conference of Learning Representations (ICLR), 2016.
Vu et al., Grounded Textual Entailment, Available Online at: https://arxiv.org/pdf/1806.05645.pdf, 2018, 15 pages.
Warstadt et al., BLiMP: The Benchmark of Linguistic Minimal Pairs for English, Transactions of the Association for Computational Linguistics, vol. 8, Jul. 1, 2020, pp. 377-392.
Williams et al., A Broad-coverage Challenge Corpus for Sentence Understanding through Inference, In Proceedings of the Conference of the North American Chapter of the Association for Computational Linguistics: Human Language Technologies, vol. 1 (Long Papers), Jun. 1-6, 2018, pp. 1112-1122.
Zhou et al., Evaluating Commonsense in Pre-trained Language Models, arXiv:1911.11931, Available Online at: https://arxiv.org/pdf/1911.11931.pdf, 2019, 8 pages.
U.S. Appl. No. 16/930,226, Non-Final Office Action, dated Aug. 24, 2022, 17 pages.
Wang et al., "A Reinforcement Learning Framework for Explainable Recommendation", IEEE International Conference on Data Mining, 2018, 10 pages.
U.S. Appl. No. 16/930,226, Notice of Allowance, dated Aug. 15, 2023, 9 pages.
U.S. Appl. No. 16/930,226, Final Office Action dated Mar. 3, 2023, 21 pages.
What is the best tool or API to know the text Similarity between Two Documents in NLP? Quora, Available Online at: https://www.quora.com/What-is-the-best-tool-or-API-to-know-the-text-similarity-between-two-documents-in-NLP, 2019, 11 pages.
Arya et al., One Explanation Does Not Fit All: A Toolkit and Taxonomy of AI Explainability Techniques, Available Online at: arXiv abs/1909.03012, Sep. 14, 2019, 18 pages.
Bahdanau et al., Neural Machine Translation by Jointly Learning to Align and Translate, International Conference on Learning Representations, May 19, 2016, 15 pages.
Bengio et al., Learning Long-Term Dependencies with Gradient Descent is Difficult, IEEE Transactions on Neural Networks, vol. 5, No. 2, Mar. 1994, pp. 157-166.
Bowman et al., Large Annotated Corpus for Learning Natural Language Inference, Available Online at: arXiv preprint arXiv:1508.05326, Aug. 21, 2015, 11 pages.
Budanitsky et al., Evaluating WordNet- Based Measures of Lexical Semantic Relatedness, Computational Linguistics, vol. 32, No. 1, Mar. 2006, pp. 13-47.
Camburu et al., e-SNLI: Natural Language Inference with Natural Language Explanations, Advances in Neural Information Processing Systems, Dec. 6, 2018, 11 pages.
Dosilovic et al., Explainable Artificial Intelligence: A Survey, In Proc. MIPRO, May 2018, pp. 210-215.
Dozat et al., Deep Biaffine Attention for Neural Dependency Parsing, Available Online at: https://arxiv.org/pdf/1611.01734.pdf, Mar. 10, 2017, pp. 1-8.
Frank et al., Insensitivity of the Human Sentence-Processing System to Hierarchical Structure, Psychological Science, vol. 22, No. 6, Available Online at: https://www.jstor.org/stable/pdf/25835458.pdf, Jun. 2011, pp. 829-834.
Galitsky et al., Assessing Plausibility of Explanation and Meta-Explanation in Inter-Human Conflicts, Engineering Applications of Artificial Intelligence, vol. 24, No. 8, Dec. 2011, pp. 1472-1486.
Galitsky et al., Chatbot Components and Architectures, In Developing Enterprise Chatbots, Springer, 2019, pp. 13-47.
Galitsky, Customers' Retention Requires an Explainability Feature in Machine Learning Systems They Use, 2018 AAAI Spring Symposium Series, 2018, pp. 214-220.
Galitsky et al., Explainable Machine Learning for Chatbots, In Developing Enterprise Chatbots, Springer, Cham, Switzerland, 2019, pp. 53-83.
Galitsky, Generalization of Parse Trees for Iterative Taxonomy Learning, Information Sciences: An International Journal, vol. 329, Issue C, Feb. 1, 2016, pp. 125-143.
Galitsky, Improving Relevance in a Content Pipeline via Syntactic Generalization, Engineering Applications of Artificial Intelligence, vol. 58, Feb. 2017, pp. 1-26.
Galitsky, Inductive Learning of Dispute Scenarios for Online Resolution of Customer Complaints, 3rd International IEEE Conference Intelligent Systems, Sep. 2006, pp. 103-108.
Galitsky et al., Learning Adversarial Reasoning Patterns in Customer Complaints, Workshop at AAAI, (WS-11-06), 2011, 8 pages.
Galitsky, Learning Discourse-Level Structures for Question Answering, Developing Enterprise Chatbots, Apr. 5, 2019, pp. 177-219.
Galitsky et al., Parse Thicket Representation for Multi-Sentence Search, In: International Conference on Conceptual Structures, vol. 7735, Jan. 2013, pp. 153-172.
He et al., Jointly Predicting Predicates and Arguments in Neural Semantic Role Labeling, Proceedings of the 56th Annual Meeting of the Association for Computational Linguistics, Available Online at: https://aclanthology.org/P18-2058.pdf, Jul. 15-20, 2018, pp. 364-369.
Jansen et al., Worldtree: A Corpus of Explanation Graphs for Elementary Science Questions Supporting Multi-Hop Inference, CoRR, abs/1802.03052, 2018, 9 pages.
Jia et al., Adversarial Examples for Evaluating Reading Comprehension Systems, Empirical Methods in Natural Language Processing, Jul. 23, 2017, 11 pages.
Liang et al., Extending Implicit Discourse Relation Recognition to the PDTB-3, Available Online at: https://arxiv.org/pdf/2010.06294v1.pdf, Oct. 13, 2020, 13 pages.
Ling et al., Program Induction by Rationale Generation: Learning to Solve and Explain Algebraic Word Problems, CoRR, abs/1705.04146, Oct. 23, 2017, 10 pages.
Marcheggiani et al., Encoding Sentences with Graph Convolutional Networks for Semantic Role Labeling, In Proceedings of the 2017 Conference on Empirical Methods in Natural Language Processing (EMNLP), Jul. 30, 2017, 11 pages.
Molnar, Interpretable Machine Learning. A Guide for Making Black Box Models Explainable, Available online at: https://christophm.github.io/interpretable-ml-book/, Aug. 14, 2018, 185 pages.
Mudrakarta et al., Did the Model Understand the Question? Available Online at: https://arxiv.org/pdf/1805.05492.pdf, May 14, 2018, 12 pages.

(56) References Cited

OTHER PUBLICATIONS

Ouyang et al., Improving Recommendation by Deep Latent Factor-Based Explanation, Associated for the Advancement of Artificial Intelligence, 2020, 9 pages.

Park et al., Multimodal Explanations: Justifying Decisions and Pointing to the Evidence, CoRR,abs/1802.08129, Feb. 15, 2018, 11 pages.

Polleti et al., Explanations Within Conversational Recommendation Systems: Improving Coverage Through Knowledge Graph Embeddings, Association for the Advancement of Artificial Intelligence (www.aaai.org), 2020, 8 pages.

Ribeiro et al., Why Should I Trust You? Explaining the Predictions of Any Classifier, KDD '16: Proceedings of the 22nd ACM SIGKDD International Conference on Knowledge Discovery and Data Mining, Available Online at: https://dl.acm.org/doi/10.1145/2939672.2939778, Aug. 2016, pp. 1135-1144.

Rohde et al., Discourse Coherence: Concurrent Explicit and Implicit Relations, In Proceedings of the 56th Annual Meeting of the ACL, Available Online at: https://aclanthology.org/P18-1210.pdf, Jul. 15-20, 2018, pp. 2257-2267.

Roth et al., Neural Semantic Role Labeling with Dependency Path Embeddings, In Proceedings of the 54th Annual Meeting of the Association for Computational Linguistics (ACL), Available Online at: https://aclanthology.org/P16-1113.pdf, Aug. 7-12, 2016, pp. 1192-1202.

Strubell et al., Linguistically-Informed Self-Attention for Semantic Role Labeling, Available Online at: https://arxiv.org/pdf/1804.08199.pdf?source=post_page . . . , Nov. 12, 2018, 14 pages.

Vaswani et al., Attention is All You Need, 31st Conference on Neural Information Processing Systems (NIPS 2017), Available Online at: https://arxiv.org/pdf/1706.03762.pdf, Dec. 6, 2017, 15 pages.

Wang et al., Learning Sentence Representation with Guidance of Human Attention, Proceedings of the Twenty-Sixth International Joint Conference on Artificial Intelligence (IJCAI-17), May 2017, pp. 4137-4143.

Webber et al., The Penn Discourse Treebank 3.0 Annotation Manual, Available Online at: https://catalog.ldc.upenn.edu/docs/LDC2019T05/PDTB3-Annotation-Manual.pdf, Mar. 15, 2019, 81 pages.

Yu et al., Learning to Skim Text, Available Online at: https://arxiv.org/pdf/1704.06877.pdf, Apr. 29, 2017, 11 pages.

Zhu et al., Explainable AI for Designers: A Human-Centered Perspective on Mixed-Initiative Co-Creation, IEEE Conference on Computational Intelligence and Games (CIG), 2018, 8 pages.

\* cited by examiner

400 elaboration
  elaboration
    contrast
      TEXT:I try to drink more liquids
      TEXT:but I do not feel thirsty.
  elaboration
    background
      TEXT:I do not want to drink
      TEXT:when I get up in the morning.
    enablement
      TEXT:I do not drink in the evening
      TEXT:so that I can sleep through the night .
    contrast
      TEXT:I try to drink more at mealtime
      TEXT:but my stomach is full.

*FIG. 4*

MACHINE READING BETWEEN THE LINES

CROSS-REFERENCES TO RELATED APPLICATIONS

This application claims the benefit of U.S. Provisional Application No. 63/144,704 filed Feb. 2, 2021, entitled "Machine Reading Between the Lines," the contents of which is incorporated herein, in its entirety, for all purposes.

TECHNICAL FIELD

This disclosure is generally concerned with linguistics. More specifically, this disclosure relates to using discourse analysis and neural machine reading comprehension generate or validate answers to questions.

BACKGROUND

Computer-implemented applications of linguistics are increasing due to the greatly increased speed of processors and capacity of memory. For example, computer-based analysis of language discourse facilitates numerous applications, such as automated agents that can answer questions received from user devices. People sometimes fail to provide important details when speaking or writing. This can be for a variety of reasons such as an unwillingness to be direct, being embarrassed, or being uncomfortable. For example, a patient may not share all information with his doctor. Therefore, readers or listeners often "read between the lines" in a person's speech or writing to determine whether essential information is unstated and therefore missing (e.g., the information is intentionally excluded by the author due to, for example, the author's belief the information is already known to the reader). Existing Natural Language Inference (NLI) systems, which address this problem, have made large gains in recent years. However, these systems remain limited by datasets which represent a fraction of human reasoning possibilities. Due to this and other limitations, there remains a gap between current NLI systems and their ability to read between the lines.

BRIEF SUMMARY

Techniques are disclosed for identifying potentially missing fragments within input text.

In some embodiments, a method of identifying one or more missing natural language expressions from input text, is disclosed. The missing information may be beneficial for subsequent machine processing/comprehension of the text. The method may comprise receiving the input text comprising a plurality of sentence fragments. The method may further comprise generating a discourse tree that represents rhetorical relations between the sentence fragments, the discourse tree including a plurality of nodes. In some embodiments, each nonterminal node of the plurality of nodes represents a rhetorical relationship between two of the sentence fragments and each terminal node of the plurality of nodes is associated with one of the sentence fragments. The method may further comprise identifying that the input text is likely missing one or more sentence fragments based at least in part on identifying that one or more rhetorical relationships of the discourse tree matches one of a set of predefined rhetorical relationships. The method may further comprise generating a query based at least in part on a subset of the plurality of sentence fragments. The method may further comprise obtaining a set of search results based at least in part on executing the query against a knowledge base. The method may further comprise obtaining, from a search results of the set of search results, a set of candidate sentence fragments for the missing one or more sentence fragments. The method may further comprise identifying a subset of sentence fragments from the set of candidate sentence fragments based at least in part on comparing the sentence fragments of the discourse tree to the set of candidate sentence fragments obtained from the search result. The method may further comprise performing one or more operations based at least in part on identifying the subset of sentence fragments, the subset of sentence fragments being implicit but excluded from the input text.

In some embodiments, the knowledge base is an online knowledge base (e.g., a knowledge base access through a public network such as the Internet).

In some embodiments, generating the query further comprises identifying repetitive sentence fragments from the plurality of sentence fragments of the input text and generating a generalized statement from the repetitive sentence fragments. In some cases, the query is generated from the generalized statement.

In some embodiments, the method may further comprise selecting the search result of the set of search results based at least in part on identifying that a relevance value between the search result and the query exceeds a predefined threshold. As part of obtaining the set of candidate sentence fragments for the missing one or more sentence fragments, a respective discourse tree may be generated from the search result.

In some embodiments, identifying the subset of sentence fragments further comprises identifying inclusion of one or more of a predefined set of rhetorical relations within the respective discourse tree and obtaining fragments associated with the one or more of the predefined set of rhetorical relations of the respective discourse tree generated from the search result. In some embodiments, the predefined set of rhetorical relations comprises at least one of: attribution, condition, background, contrast, cause, or explanation.

The exemplary method(s) discussed herein can be implemented on systems and/or devices including one or more processors and/or stored as instructions on a non-transitory computer-readable medium.

BRIEF DESCRIPTION OF THE DRAWINGS

FIG. 4 depicts a discourse tree for another instance of input text, in accordance with at least one embodiment.

DETAILED DESCRIPTION

Figure 1:
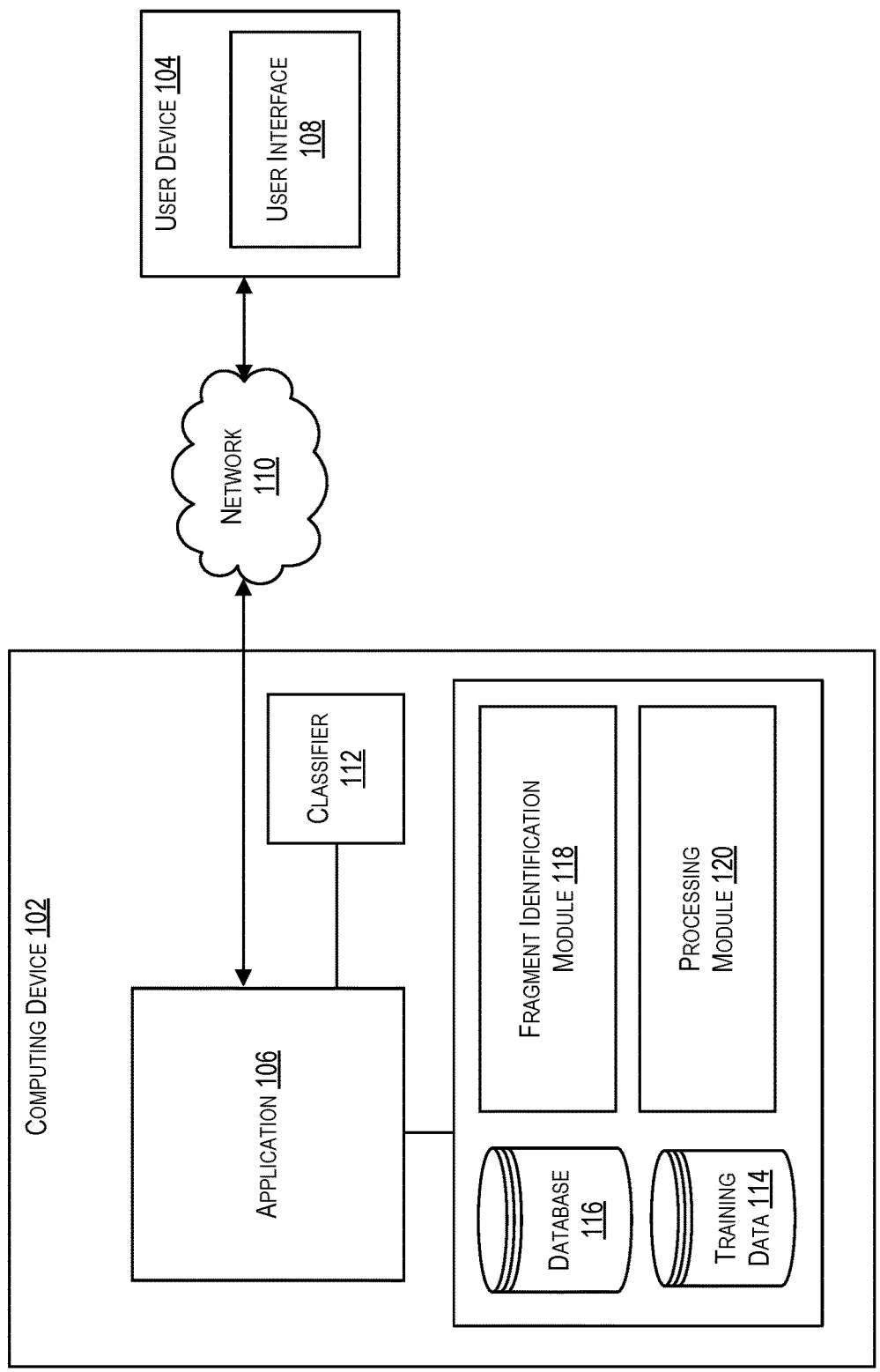
FIG. 1 depicts an example of a computing environment for identifying one or more missing natural language expressions from input text, in accordance with at least one embodiment of the present disclosure.

Aspects of the present disclosure relate to identifying one or more missing natural language expressions from input text.

"Reading Between the Lines (RBL)" techniques disclosed herein refer to operations for forming natural language (NL) expressions which are not included by an author in input text but are believed to be assumed by the author. RBL is necessary to identify a hidden meaning of text, something the author intends to conceal, or would prefer not to confess or explicitly state. By way of example only, in medical complaints, RBL is essential to reveal the information the patient might not want to share with the physician. Discourse analysis can be utilized to identify a position in text where RBL techniques are expected to yield results, syntactic generalization to formulate a query for web mining, and information extraction from documents to obtain RBL results.

The RBL techniques disclosed here may be utilized to find or generate portions of text which express what the author intended to say, but did not actually state in text. RBL can identify the following components, including, but not limited to:

Entities missing in texts, but assumed to be understood and identified by the reader;

Attributes of these entities which are either default or which could be negatively perceived by the reader, according to the author;

Opinions on a mentioned topic, which the author does not want to explain explicitly;

Sentiments about an entity, which the author prefers to avoid writing explicitly but expects the reader to comprehend; and Explanation or argumentation links between facts and clauses mentioned in text, which can be recovered by a competent reader.

The RBL techniques can form one or more phrases that logically connect two statements in text. This phrase is not mentioned by the author but either assumed or intentionally concealed.

A simple example can be related to child development. Usually, toddlers avoid accepting that they are tired and ready to go to bed. Instead, they say they are hungry, thirsty, bored, etc. It is then the task of the caregiver to deduce that what the child actually means by referring to her different intents is something she is not explicitly mentioning: an intent to sleep. The missing natural language expression here is "I want to sleep" and the statements include various other intents which do not really characterize the states of mind of a toddler girl but need to be connected with sleep.

Machine Reading Comprehension (MRC) involves, among others, identifying what is implied but not expressed in text. This task, known as textual entailment (TE), offers a natural abstraction for many natural language processing (NLP) tasks. This task has been recognized as a central tool for the new area of Machine Reading. Important in the study of textual entailment is making precise the sense in which something is implied by text. The operational definition often employed is a subjective one: something is implied if humans are more likely to believe it given the truth of the text, than otherwise. The techniques described herein operate on the premise that the input text is a partial depiction of some underlying hidden reality. Reality is mapped into text through a possibly stochastic process, the author of the text. Textual entailment is then formalized as the task of accurately, in a defined sense, recovering information about this hidden reality.

Despite the usefulness of Natural Language Inference (NLI), and advances made in the recent years, an important drawback remains in this line of work: NLI systems are evaluated against datasets which represent only a fraction of human reasoning possibilities. Furthermore, these different datasets seem to have arisen from the need to test specific theoretical architectures, for example, logical approaches in the case of the FraCaS test suite, Deep Learning (DL) architectures in the case of Stanford Natural Language Inference Dataset (SNLI), etc. The consequence is that, in practice, NLI systems perform very poorly on any dataset which was not specifically intended to test it. As such, the different systems designed to tackle NLI are not only incomplete, but not even comparable. There is a need for improvements in the ability to identify missing natural language expressions from input text. Although the following figures may provide examples in a particular domain (e.g., a medical domain), the same techniques and examples may be equally applied to any suitable domain.

Certain Definitions

As used herein, "rhetorical structure theory" is an area of research and study that provided a theoretical basis upon which the coherence of a discourse could be analyzed.

As used herein, "discourse tree" or "DT" refers to a structure that represents the rhetorical relations for a sentence of part of a sentence.

As used herein, a "rhetorical relation," "rhetorical relationship," or "coherence relation" or "discourse relation" refers to how two segments of discourse are logically connected to one another. Examples of rhetorical relations include elaboration, contrast, and attribution.

As used herein, a "sentence fragment," or "fragment" is a part of a sentence that can be divided from the rest of the sentence. A fragment is an elementary discourse unit. For example, for the sentence "Dutch accident investigators say that evidence points to pro-Russian rebels as being responsible for shooting down the plane," two fragments are "Dutch accident investigators say that evidence points to pro-Russian rebels" and "as being responsible for shooting down the plane." A fragment can, but need not, include a verb.

As used herein, "signature" or "frame" refers to a property of a verb in a fragment. Each signature can include one or more thematic roles. For example, for the fragment "Dutch accident investigators say that evidence points to pro-Russian rebels," the verb is "say" and the signature of this particular use of the verb "say" could be "agent verb topic" where "investigators" is the agent and "evidence" is the topic.

As used herein, "thematic role" refers to components of a signature used to describe a role of one or more words. Continuing the previous example, "agent" and "topic" are thematic roles.

As used herein, "nuclearity" refers to which text segment, fragment, or span, is more central to a writer's purpose. The nucleus is the more central span, and the satellite is the less central one.

As used herein, "coherency" refers to the linking together of two rhetorical relations.

As used herein, a "communicative discourse trees" or a "CDT" is a discourse tree that is supplemented with communicative actions. A communicative action is a cooperative action undertaken by individuals based on mutual deliberation and argumentation. Communicative discourse trees therefore combine rhetoric information with communicative actions.

As used herein, "communicative verb" is a verb that indicates communication. For example, the verb "deny" is a communicative verb.

As used herein, "communicative action" describes an action performed by one or more agents and the subjects of the agents.

As used herein, an "entity" has an independent and distinct existence. Examples includes objects, places, and persons. An entity can also be a subject or topic such as "electric cars," "brakes," or "France."

FIG. 1 depicts an example of a computing environment for identifying one or more missing natural language expressions from input text, in accordance with at least one embodiment of the present disclosure. In the example depicted in FIG. 1, computing environment 100 includes one or more of computing device 102 and user device 104. Computing device 102 can implement an application (e.g., application 106). In some embodiments, the application 106 may be an autonomous agent (e.g., a chatbot) that engages in a conversation with user device 104 and uses one or more of the techniques disclosed herein to dialog in response to input provided by user device 106. As another example, application 106 can be part of a machine-reading comprehension component of computing device 102. Application 106 can be configured to take input text (e.g., corresponding to data received from user device 104) and identify missing natural language expressions from the text. Examples of computing device 102 are an example of the distributed system 700 of FIG. 7 and client computing devices 702, 704, 706, and 708.

User device 104 can be any mobile device such as a mobile phone, smart phone, tablet, laptop, smart watch, and the like. As depicted, user device 104 user interface 108. User interface 108 may be configured to accept input from the user (e.g., via keyboard, microphone inputs, mouse inputs, touch screen, etc.) and provide such input to the computing device 102. In some embodiments, the user interface 108, or another component of the user device 104, may be configured to take vocal input and convert it to text prior to transmitting the text to computing device 102. The user device 104 may be configured to transmit text to the computing device 102. In other embodiments, the text may be obtained using a user interface (not depicted) provided by the computing device 102 and/or from a data store (not depicted) accessible to the computing device 102. Examples of suitable text include electronic text source such as text files, Portable Document Format (PDF)® documents, rich text documents, and the like. In some cases, preprocessing may be performed on the input text to remove unwanted characters or formatting fields. Input text can be organized by using one or more structural or organizational approaches such as sections, paragraphs, pages, and the like.

In some embodiments, user device 104 and computing device 102 may be communicatively connected via network 110. Network 110 can be any suitable public or private network including the Internet, a local area network, a virtual private network, or the like.

In some embodiments, the computing device 102 may include a classifier 112. Classifier 112 may be any suitable machine-learning model trained using training data 114 to provide output (e.g., an answer) in response to input (e.g., a question submitted at user interface 108). In some cases, entities within text (e.g., input text, search results, etc.) are matched using knowledge database 116. Knowledge database 116 can be a domain-specific ontology (e.g., finance, law, business, science, etc.). The knowledge database 116, among other features, can provide synonym matching. In some embodiments, application 106 can build database 116 or training data 114 from an external source.

Computing device 102 may include fragment identification module 118. In some embodiments, fragment identification module 118 may be configured to identify one or more fragments (and/or natural language expressions) that are missing from input text. That is, fragments that are implied by the input text, but excluded from the input text. Operations for identifying such fragments are discussed in more detail with respect to FIGS. 2-5.

In some embodiments, computing device 102 may include processing module 120. Processing module 120 may be configured to determine and execute one or more operations based at least in part on receiving an indication from the fragment identification module 118 that one or more missing fragments were identified from an instance of input text.

Figure 2:
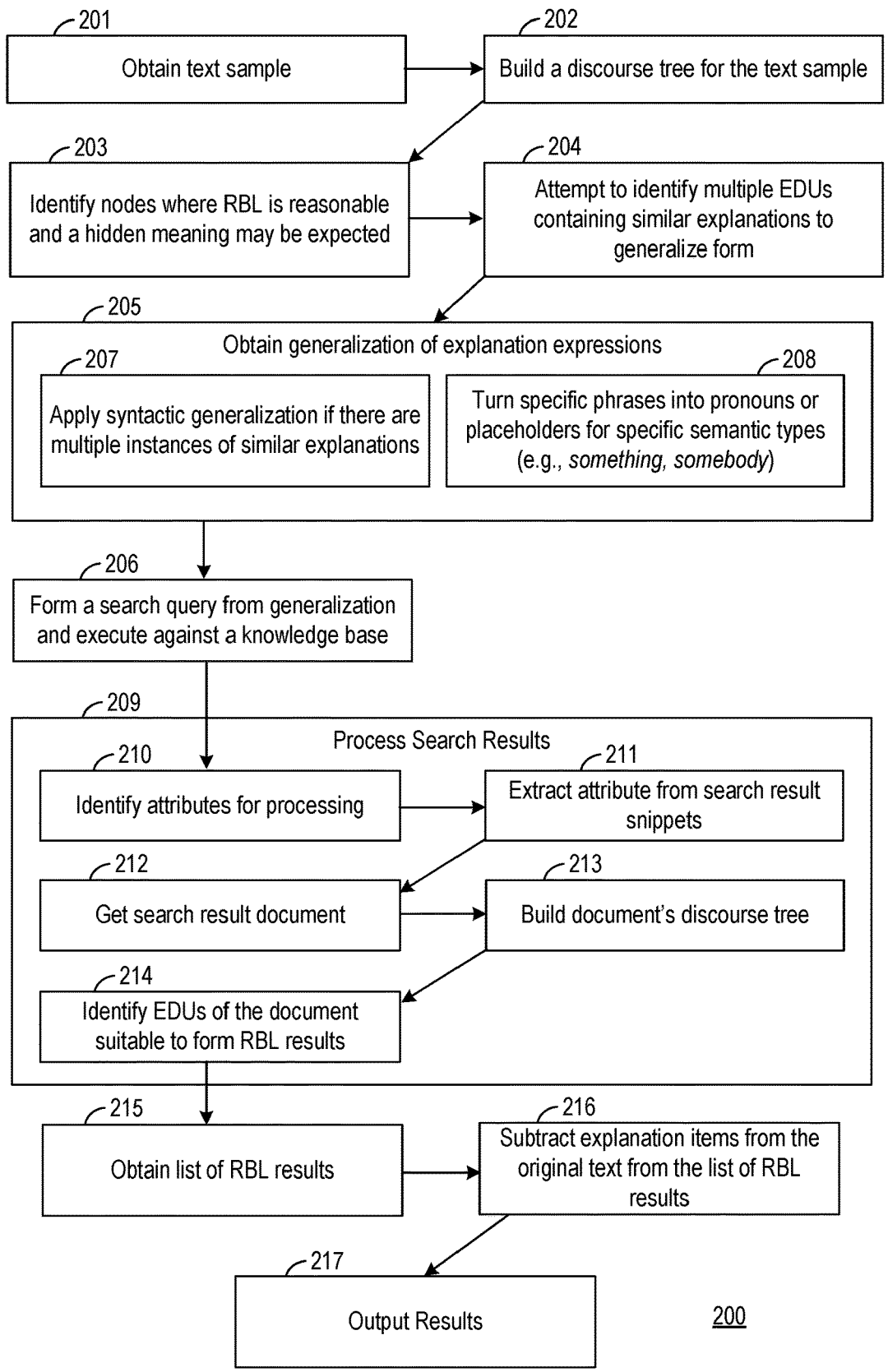
FIG. 2 depicts an example flow for a method performed by the identification module of FIG. 1, in accordance with at least one embodiment.

FIG. 2 depicts an example flow for a method 200 performed by the fragment identification module of FIG. 1, in accordance with at least one embodiment.

The method 200 may begin at 201, where a text sample (also referred to as "input text") is obtained. In some embodiments, the text sample may be obtained from the user device 104 via user interface 108 of FIG. 1. As another example, the text sample may be of any suitable length and content. As a non-limiting example, an instance of input text is provided below.

I avoid flu shots because I am allergic to eggs. Most flu shots produced today use an egg-based manufacturing process that leaves trace amounts of egg protein behind. I do not need a flu shot since I got it last year. I believe it is not necessary for me, because the vaccine is not 100% effective. Also, I never get the flu, so I do not need a vaccine.

Figure 3:
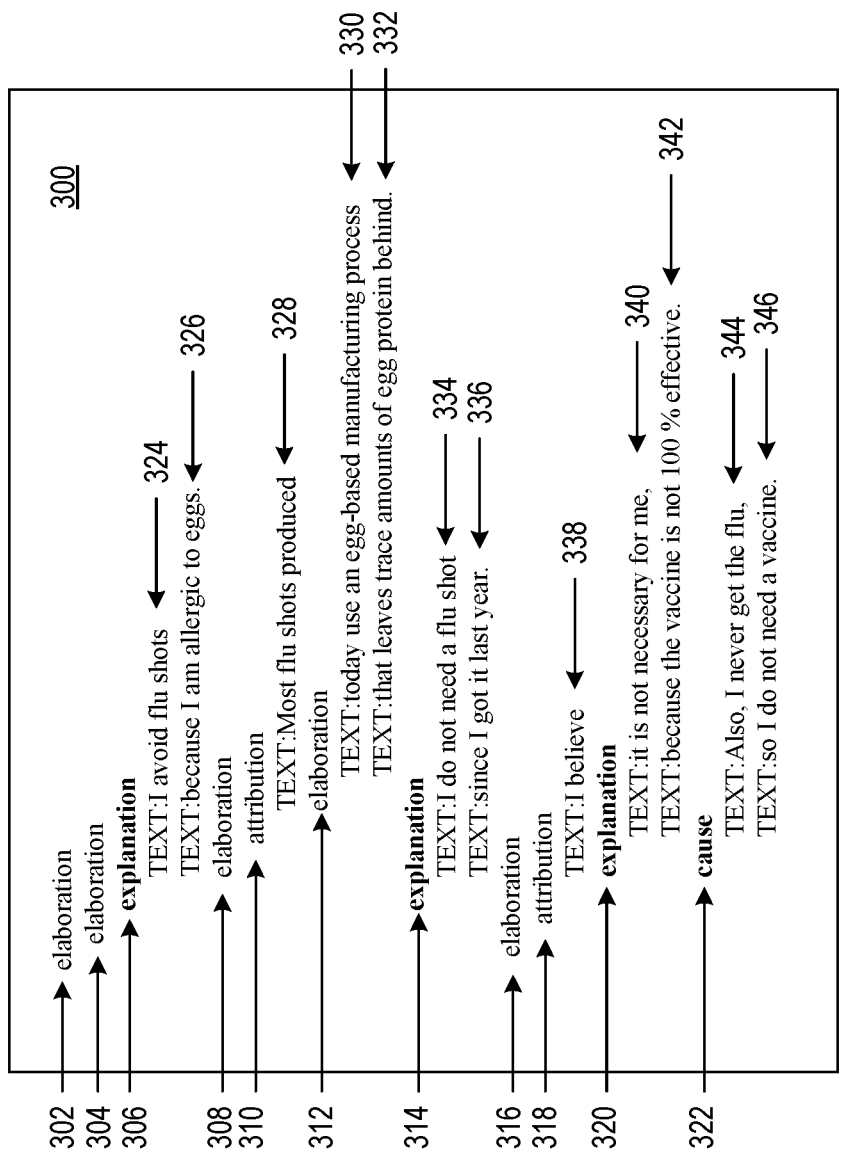
FIG. 3 depicts a discourse tree for an instance of input text, in accordance with at least one embodiment.

At 202, a discourse tree may be built for the text sample. FIG. 3 describes the discourse tree and method for generating said discourse tree in more detail.

FIG. 3 depicts a discourse tree 300 for an instance of input text (e.g., the example text provided above in connection with FIG. 2), in accordance with at least one embodiment. The discourse tree 300 may be generated from the input text described above with respect to FIG. 2 based at least in part on Rhetorical Structure Theory.

Rhetoric Structure Theory and Discourse Trees

Linguistics is the scientific study of language. For example, linguistics can include the structure of a sentence (syntax), e.g., subject-verb-object, the meaning of a sentence (semantics), e.g. dog bites man vs. man bites dog, and what speakers do in conversation, i.e., discourse analysis or the analysis of language beyond the sentence.

The theoretical underpinnings of discourse, Rhetoric Structure Theory (RST), can be attributed to Mann, William and Thompson, Sandra, "Rhetorical structure theory: A Theory of Text organization," Text-Interdisciplinary Journal for the Study of Discourse, 8(3):243-281, 1988. Similar to how the syntax and semantics of programming language theory helped enable modern software compilers, RST helped enabled the analysis of discourse. More specifically RST posits structural blocks on at least two levels, a first level such as nuclearity and rhetorical relations, and a second level of structures or schemas. Discourse parsers or other computer software can parse text into a discourse tree.

Rhetoric Structure Theory models logical organization of text, a structure employed by a writer, relying on relations between parts of text. RST simulates text coherence by forming a hierarchical, connected structure of texts via discourse trees. Rhetoric relations are split into the classes of coordinate and subordinate; these relations hold across two or more text spans and therefore implement coherence. These text spans are called elementary discourse units (EDUs). Clauses in a sentence and sentences in a text are logically connected by the author. The meaning of a given sentence is related to that of the previous and the following sentences. This logical relation between clauses is called the coherence structure of the text. RST is one of the most popular theories of discourse, being based on a tree-like discourse structure, discourse trees (DTs). The leaves of a DT correspond to EDUs, the contiguous atomic text spans. Adjacent EDUs are connected by coherence relations (e.g., Attribution, Sequence), forming higher-level discourse units. These units are then also subject to this relation linking. EDUs linked by a relation are then differentiated based on their relative importance: nuclei are the core parts of the relation, while satellites are peripheral ones. As discussed, in order to determine accurate request-response pairs, both topic and rhetorical agreement are analyzed. When a speaker answers a question, such as a phrase or a sentence, the speaker's answer should address the topic of this question. In the case of an implicit formulation of a question, via a seed text of a message, an appropriate answer is expected not only maintain a topic, but also match the generalized epistemic state of this seed.

Rhetoric Relations

As discussed, aspects described herein use communicative discourse trees. Rhetorical relations can be described in different ways. Some rhetorical relations are provided below. However, this list is not intended to be exhaustive.

| Relation Name | Nucleus | Satellite |
|---|---|---|
| Antithesis | ideas favored by the author | ideas disfavored by the author |
| Attribution | a statement | information describing additional information attributed to the statement |
| Background | text whose understanding is being facilitated | text for facilitating understanding |
| Cause | a statement | information describing a causal link between the statement and an assertion |
| Circumstance | text expressing the events or ideas occurring in the interpretive context | an interpretive context of situation or time |
| Concession | situation affirmed by author | situation which is apparently inconsistent but also affirmed by author |
| Condition | action or situation whose occurrence results from the occurrence of the conditioning situation | conditioning situation |
| Elaboration | basic information | additional information |

| Relation Name | Nucleus | Satellite |
|---|---|---|
| Enablement | an action | information intended to aid the reader in performing an action |
| Evaluation | a situation | an evaluative comment about the situation |
| Evidence | a claim | information intended to increase the reader's belief in the claim |
| Explanation | a statement | information describing one or more reasons for the statement |
| Interpretation | a situation | an interpretation of the situation |
| Justify | text | information supporting the writer's right to express the text |
| Motivation | an action | information intended to increase the reader's desire to perform the action |
| Non-volitional Cause | a situation | another situation which causes that one, but not by anyone's deliberate action |
| Non-volitional Result | a situation | another situation which is caused by that one, but not by anyone's deliberate action |
| Otherwise (anti conditional) | action or situation whose occurrence results from the lack of occurrence of the conditioning situation | conditioning situation |
| Purpose | an intended situation | the intent behind the situation |
| Restatement | a situation | a re-expression of the situation |
| Solutionhood | a situation or method supporting full or partial satisfaction of the need | a question, request, problem, or other expressed need |
| Summary | text | a short summary of that text |
| Volitional Cause | a situation | another situation which causes that one, by someone's deliberate action |
| Volitional Result | a situation | another situation which is caused by that one, by someone's deliberate action |

Some empirical studies postulate that the majority of text is structured using nucleus-satellite relations, but other relations do not carry a definite selection of a nucleus. Examples of such relations are shown below.

| Relation Name | Span | Other Span |
|---|---|---|
| Contrast | One alternate | The other alternate |
| Joint | (unconstrained) | (unconstrained) |
| List | An item | A next item |
| Sequence | An item | A next item |

Returning to FIG. 3, the discourse tree 300 may be generated based on parsing the input text. Discourse tree 300 may include any suitable combination of the rhetorical relations (also referred to as "rhetorical relationships") described above. For example, discourse tree 300 may include rhetorical relationships 302-322. Discourse tree 300 may further include a number of text (e.g., elementary discourse unit (EDU) 324-346). Each rhetorical relation describes a rhetorical relationship between two or more EDUs. By way of example, rhetorical relation 314 may describe a rhetorical relationship (e.g., "explanation") between EDU 334 and EDU 336.

Any suitable method for constructing the discourse tree 300 may be utilized. One example method for constructing discourse tree 300 may include the following operations:

(1) Divide the discourse text into units by:
    (a) Unit size may vary, depending on the goals of the analysis (b) Typically, units are clauses
(2) Examine each unit, and its neighbors. Is there a relation holding between them?
(3) If yes, then mark that relation.
(4) If not, the unit might be at the boundary of a higher-level relation. Look at relations holding between larger units (spans).
(5) Continue until all the units in the text are accounted for.

Returning to FIG. 2, the method 200 may proceed to 203 after the discourse tree 300 is constructed. At 203, a number of nodes where RBL techniques may be reasonably applied may be identified (e.g., where hidden meaning may be expected/present). In some embodiments, each of the nodes of the discourse tree 300, corresponding to the rhetorical relations 302-322 may be compared to a predefined set of rhetorical relations. This predefined set may include any suitable number of rhetorical relations that may indicate potential hidden meaning. By way of example, a sample predefined set of rhetorical relations may include explanation and cause (although more or fewer rhetorical relations may be included in this set). If rhetorical relations 302-322 are not found to include at least one rhetorical relation from the predefined set of rhetorical relations, the determination may be made that the input text is not missing one or more fragments/natural language expressions. In this case, further processing may not be necessary and the method 200 may end. Alternatively, if at least one of the rhetorical relations 302-322 are identified as matching at least one rhetorical relation from the predefined set of rhetorical relations, the method 200 may proceed to 204.

At 204, operations to identify multiple EDUs containing similar explanations may be performed in order to identify a generalized form from which a search query may be eventually formed. First, expressions of intent may be identified from the discourse tree 300. These are identified based on being followed by discourse markers such as because, since, and so on. In the ongoing example, a set of expressions of intent from the input text may include "I avoid flu shots, I do not need a flu shot, I believe it is not necessary for me, I do not need a vaccine."

At 205, operations for obtaining a generalization of explanation expressions may be identified. In the ongoing example, a number of templates may be identified for the sentences from a set of predefined templates. By way of example, the set of expressions of intent above may be matched to templates <patient intent> <discourse marker for the reason> <reason> or <reason> <discourse marker for the reason> <patient intent>. A coreference resolution to substitute "it" with 'flu shot' may be utilized to properly generalize these reasons.

In some embodiments, the method 200 may proceed to 206 where a search query is formed based on the generalization obtained at 205. In the ongoing example, the generalization may be negated to construct a query "Why people+ generalize(list-of-causes)=Why people <avoid/do not want/ do not do> flu shots?"

In some embodiments, the author of the input text may include multiple instances of similar expressions. In this case, rather than proceeding immediately to 206, the method 200 may proceed to 207, where syntactic generalization may be employed to identify a generalization for these multiple instances. FIG. 4 depicts a discourse tree 400 for another instance of input text, in accordance with at least one embodiment. The input text corresponding to discourse tree 400 is as follows:

I try to drink more liquids but I do not feel thirsty. I do not want to drink when I get up in the morning. I do not drink in the evening so that I can sleep through the night. I try to drink more at mealtime but my stomach is full.

The input text in this example includes multiple similar expressions (e.g., I try to drink more, I do not/do not want to drink). Upon identifying, from the discourse tree 400, the existence of the similar expressions, operations may be performed to generate syntax trees of the expressions with which syntactic generalization operations may be performed.

Figure 5:
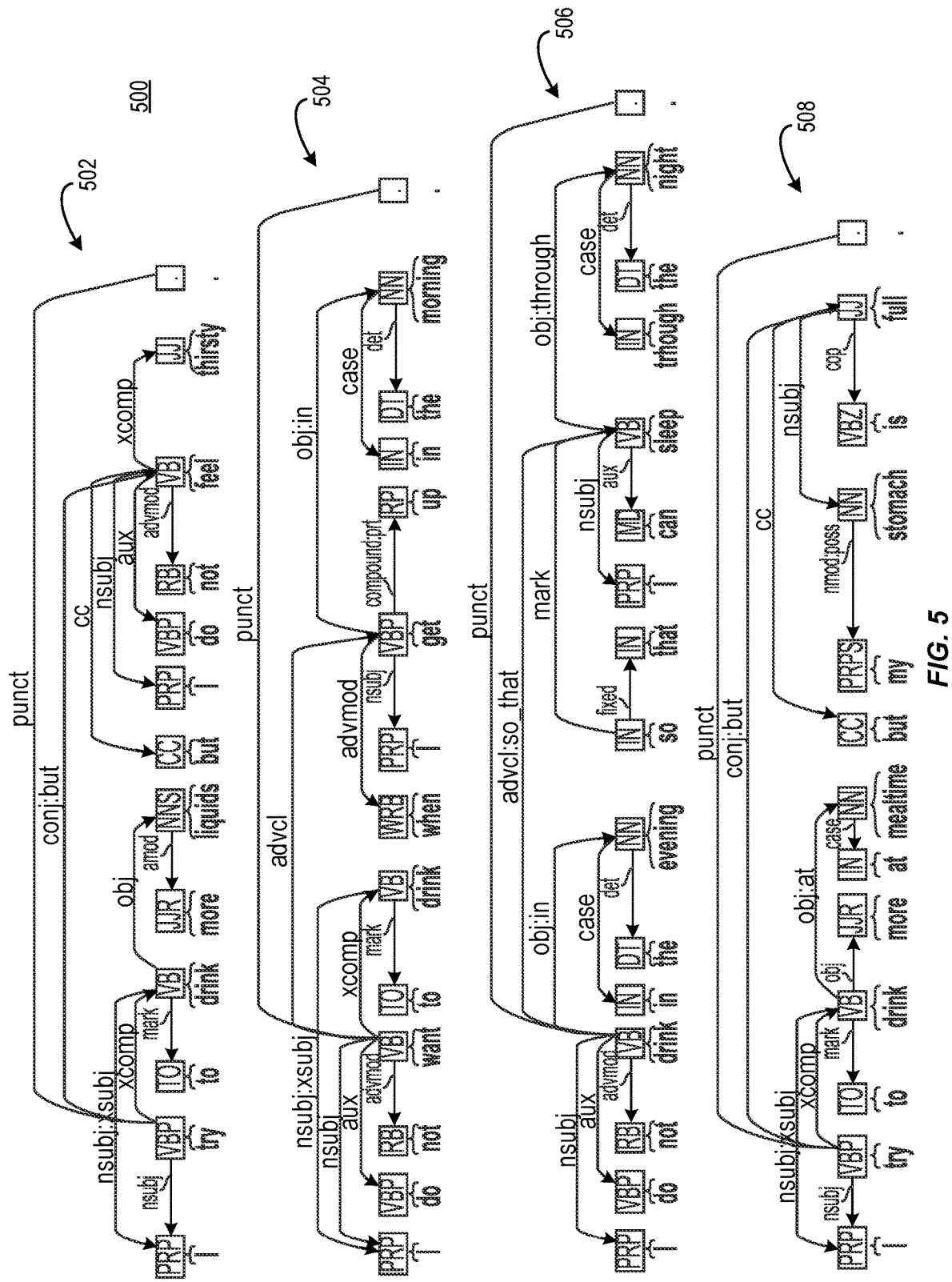
FIG. 5 depicts syntax trees for each sentence of input text, in accordance with at least one embodiment.

FIG. 5 depicts syntax trees 502-508 for each sentence of input text, in accordance with at least one embodiment. A syntax tree is a tree representation of the abstract syntactic structure of text. The syntax trees 502-508 represent the syntax of each sentence of the input text described immediately above. The trees describe the sequence of subject, verbs, nouns, noun phrases, and the like are sequenced in a given sentence. Thus, each syntax tree of FIG. 5, provides a tree representation of the underlying syntactic categories of a sentence. Each node of the syntax tree corresponds to a word in the sentence. Each terminal node corresponds to a word in the sentence and can be associated with a tag/label that identifies the word as a particular syntactical component. Such labels can include, but are not limited to:

| Label | Syntactical Component |
| --- | --- |
| NN | Singular Noun |
| NNS | Plural Noun |
| NNP | Proper Noun |
| VBD | Past tense verb |
| VBZ | 3rd person singular present tense verb |
| PRP | Pronoun |
| JJ | Adjective |
| IN | Preposition |
| DT | Determiner |
| VBN | Past participle |
| Punct | Punctuation |
| VBP | Non-3rd person singular present tense verb |
| PRPS | Possessive pronoun |

Phrases of the sentence can be similarly tagged/associated with labels identifying the phrase as a particular syntactical component (e.g., noun phrase, verb phrase, prepositional phrase, etc.). The syntax trees can include non-terminal nodes which connect terminal nodes (e.g., two terminal nodes). The non-terminal node may also be associated with tags/labels that correspond to the parts of speech. These tags/labels may identify syntactic relationships between terminal nodes. Using the syntax tree 502-506, a generalization (e.g., identify an expression that can broadly represent a number of more-specific expressions) may be generated utilizing any suitable predefined rules for syntactic generalization.

Syntactic Generalization

To measure of similarity of abstract entities expressed by logic formulas, a least-general generalization is proposed for a number of machine learning approaches, including explanation based learning and inductive logic programming. For two words of the same part of speech (POS), their generalization is the same word with the POS. If the lemmas for the two words are different but the POS is the same, then the POS remains in the result. If lemmas are the same but POS is different, lemma stays in the result. A lemma represents a word without the related part-of-speech information.

To illustrate this concept, consider an example of two natural language expressions. The meanings of the expressions are represented by logic formulas. The unification and anti-unification of these formulas are constructed. Some words (entities) are mapped to predicates, some are mapped into their arguments, and some other words do not explicitly occur in logic form representation but indicate the above instantiation of predicates with arguments.

Consider the following two sentences "camera with digital zoom" and "camera with zoom for beginners." To express the meanings, the following logic predicates are used:

camera(name_of_feature, type_of_users) and zoom(type_of_zoom).

Note that this is a simplified example, and as such, may have a reduced number of arguments as compared to more typical examples. Continuing the example, the above expressions can be represented as: camera(zoom(digital), AnyUser), camera(zoom(AnyZoom), beginner)

According to the notation, variables (non-instantiated values, not specified in NL expressions) are capitalized. Given the above pair of formulas, unification computes their most general specialization camera(zoom(digital), beginner), and anti-unification computes their most specific generalization, camera(zoom(AnyZoom), AnyUser).

At the syntactic level, the expressions are subjected to a generalization ('^') of two noun phrases as: {NN-camera, PRP-with, [digital], NN-zoom [for beginners]}. The expressions in square brackets are eliminated because they occur in one expression but not occur in the other. As a result, obtain{NN-camera, PRP-with, NN-zoom]}, which is a syntactic analog of semantic generalization, is obtained.

The purpose of an abstract generalization is to find commonality between portions of text at various semantic levels. Generalization operation occurs on the one or more levels. Examples of levels are paragraph level, sentence level, phrase level, and word level.

At each level (except word-level), individual words, the result of generalization of two expressions is a set of expressions. In such set, for each pair of expressions so that one is less general than other, the latter is eliminated. Generalization of two sets of expressions is a set of sets which are the results of pair-wise generalization of these expressions.

Only a single generalization exists for a pair of words: if words are the same in the same form, the result is a node with this word in this form. To involve word2vec models, compute generalization of two different words, the following rule is used. If subject1=subject2, then subject1^subject2=<subject1, POS(subject1), 1>. Otherwise, if they have the same part-of-speech, subject1^subject2=<*,POS(subject1), word2vecDistance (subject1^subject2)>. If part-of-speech is different, generalization is an empty tuple. It cannot be further generalized.

For a pair of phrases, generalization includes all maximum ordered sets of generalization nodes for words in phrases so that the order of words is retained. In the following example, "To buy digital camera today, on Monday."

"Digital camera was a good buy today, first Monday of the month."

Generalization is {<JJ-digital, NN-camera>, <NN-today, ADV, Monday>}, where the generalization for noun phrases is followed by the generalization for an adverbial phrase. Verb buy is excluded from both generalizations because it occurs in a different order in the above phrases. Buy-digital-camera is not a generalization phrase because buy occurs in different sequence with the other generalization nodes.

Using the syntax trees of FIG. 5, a generalization may be identified. Returning to FIG. 2, at 208, specific phrases may be modified to include pronouns or placeholders for specific semantic types (e.g., something, somebody, etc.). The method 200 may then proceed to 206.

At 206, a search query may be formed from the generalization identified at 205. In the first example regarding flu shots, the search query may be identified as "Why people <avoid/do not want/do not do> flu shots?" In the second example regarding drinking liquids, the search query may be identified as "Why people avoid drinking more water?" Once formed, the search query can be executed against a knowledge base. By way of example, the search query can be provided to a publically available search engine and executed to search an online knowledge base (e.g., the Internet). As another example, the search query may be executed against a local database (e.g., a corpus of medical documents, for example).

At 209, the search results may be processed (e.g., by the fragment identification module 118 of FIG. 1). The operations for processing the search results may be to find applicable search results from which information can be extracted and matched with the input text. For example, executing the query "Why people <avoid/do not want/do not do> flu shots?" may be utilized to identify search results that provide various reasons why one might avoid a flu shot. These reasons can be compared to the reason(s) the author of the subject text gave for avoiding the flu shot and the difference can indicate one or more natural language expressions that were missing (e.g., implied but not included) from the input text. More or fewer of the operations 210-214 may be executed, not necessary the same operations, or in the same order as described in connection to processing the search results at 209.

At 210, specific attributes of search result in general may be identified from a predefined set of rules. By way of example, the predefined set of rules may indicate that a search result associated with a title that includes a number may be more relevant than others. By way of example, a title that includes "4 causes," "5 reasons," 6 excuses," or the like, may be selected. In some embodiments, one or more attributes of the search results (e.g., length, title, first sentence, etc.) may be identified from these rules.

At 211, the attribute (e.g., title) identified from 210 may be utilized to extract a portion (e.g., a snippit, a title, a sentence, a first paragraph, etc.) from each search result. In some embodiments, the extracted attributes of each search result may be utilized to generate a relevancy/quality score that indicates a degree to which the search results is likely to provide information from which missing natural language expressions may be identified. In some embodiments, a highest ranked set of one or more search results may be selected for further processing.

At 212, a search result document may be obtained based at least in part on the ranking/score. For example, a highest scored/ranked search result may be obtained. Any suitable number of search results may be utilized. Each of the selected search results may be utilized to perform the operations of 213 and 214.

At 213, a discourse tree may be built for the search result document in the same manner as described above with respect to building discourse tree 300 of FIG. 3.

At 214, a number of EDUs form the discourse tree generated from the search result may be identified as being suitable to form RBL results. For example, the rhetorical relations of the discourse tree generated from the search result may be utilized to identify a number of rhetorical relations that match one of a predefined set of rhetorical relations (e.g., the same or a different set from the one used at 204). Discourse analysis may be applied to discover EDUs which can form promising candidate RBL results. Default rhetorical relations of Elaboration and Joint may be considered least interesting and ignored. What is likely of interest with respect to obtaining RBL results is something extraordinary, unexpected, emergent, etc. In some embodiments, Attribution, Condition, and Background may be utilized in the predefined set of rhetorical relations as these relations may be indicative of a potentially informative EDUs. In some cases, Contrast, Cause, Explanation are introducing facts and observations that stand out of routine people knowledge, and provide the best candidate RBL results.

At 215, the EDUs identified at 215 may be used to obtain a list of RBL results (e.g., a set of candidate sentence fragments that may be used to determine sentence fragments potentially missing from the input text). By way of example, a set of candidate sentence fragments (referred to as "reasons"), identified from one or more search results, may include: {Vaccines are dangerous and give kids autism, I got the vaccine one year and it didn't work, I have egg allergies, I don't get the flu, the flu vaccine can give you the flu}.

At 216, the set of candidate sentence fragments and a set of sentence fragments identified from the input text may be compared. For example, the set of fragments of the input text may include: {I am allergic to eggs, I believe it is not necessary for me, I got it last year, I never get the flu}. In some embodiments, the fragments of the input text may be utilized to subtract corresponding fragments from the set of candidate sentence fragments. The remaining fragments of the candidate set may be identified as RBL results. By way of example, the expression 'I got the vaccine one year and it didn't work' may be identified as corresponding to 'I got it last year', 'I have egg allergies' may be identified as corresponding to 'I am allergic to eggs', and 'I don't get the flu' may be identified as corresponding to 'I never get the flu'. In this example, the RBL result set (e.g., the difference between the candidate set of fragments and the set of fragments of the input set) may include {vaccines are dangerous and give kids autism, the flu vaccine can give you the flu}. Thus, the remaining fragments of the candidate set that did not correspond to the set of fragments identified from the input text may be considered potential natural language expressions that were implied in the input text, but not explicitly disclosed.

At 217, the results of the operations 201-216 may be outputted. For example, the set {vaccines are dangerous and give kids autism, the flu vaccine can give you the flu} may be provided (e.g., to the processing module 120 of FIG. 1) for further processing. Depending on the context the processing module 120 may perform one or more operations utilizing the results. For example, if the application 106 of FIG. 1 is a medical diagnostic assistance device, the physician may input the input text (e.g., corresponding to the patient's statement) and receive output (e.g., by the processing module 120 via an interface (not depicted in FIG. 1)) that indicates the information potentially missing from the input text (e.g., possible reasons the patient avoids the flu shot that was not explicitly disclosed). In a chat bot context, a user may provide input text as part of a dialog, the application 106 may, utilizing the techniques described herein, identify that there is potentially missing information. In this case, the processing module may be utilized to formulate dialog to present to the user (e.g., questioning whether the user avoids flu shots due to a concerns regarding whether vaccines are dangerous/give kids autism and/or that the flu vaccine can give you the flu).

Figure 6:
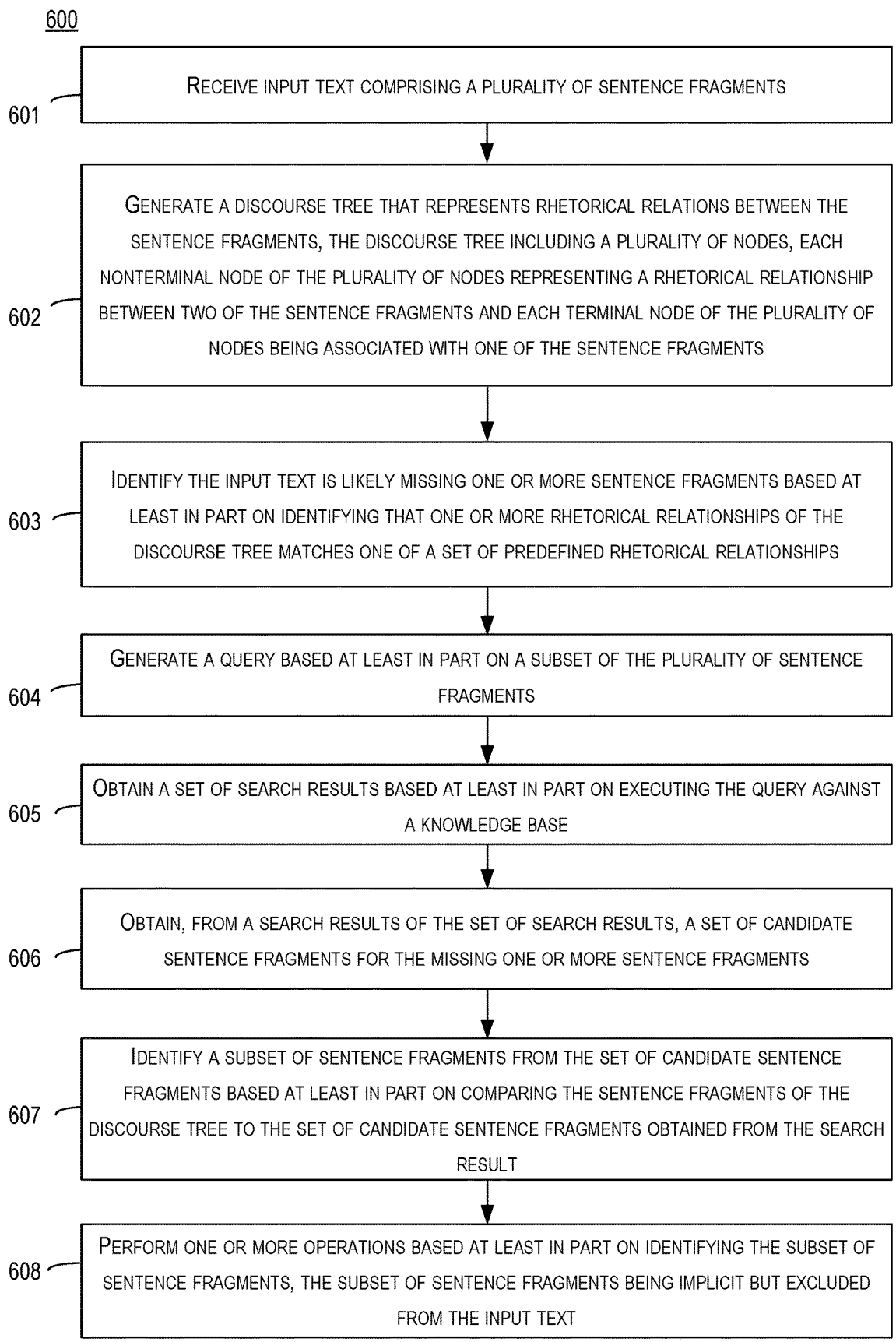
FIG. 6 depicts a flowchart illustrating an example method for identifying one or more missing natural language expressions from input text, in accordance with at least one embodiment.

FIG. 6 depicts a flowchart illustrating an example method (e.g., method 600) for identifying one or more missing natural language expressions from input text, in accordance with at least one embodiment. In some embodiments, the method 600 may be performed by the computing device 102 of FIG. 1 (e.g., application 106 of FIG. 1). The steps of method 600 may be performed in any suitable order. In some embodiments, the method 600 may include more operations than those depicted in FIG. 6, or fewer operations than those depicted in FIG. 6.

The method 600 may begin at 601, where the input text comprising a plurality of sentence fragments is received. As discussed above, the input text may be of any suitable length or content and may be received (obtained) from the user device 104 of FIG. 1.

At 602, a discourse tree (e.g., discourse tree 300 of FIG. 3) that represents rhetorical relations between the sentence fragments may be generated. In some embodiments, the discourse tree including a plurality of nodes, each nonterminal node of the plurality of nodes representing a rhetorical relationship between two of the sentence fragments and each terminal node of the plurality of nodes being associated with one of the sentence fragments.

At 603, the input text is identified as likely missing one or more sentence fragments based at least in part on identifying that one or more rhetorical relationships of the discourse tree matches one of a set of predefined rhetorical relationships.

At 603, a query (e.g., a search query) may be generated based at least in part on a subset of the plurality of sentence fragments. For example, a search query may be generated based at least in part on generalizing any suitable fragment of the input text (e.g., one of the sentence fragments that corresponds to a rhetorical relationship matched to the predefined set of rhetorical relationships). If multiple fragments (e.g., sentences) express similar expressions, syntax trees may be generated for these fragments and the syntactic components identified from the syntax tree may be utilized to form a generalized expression that broadly applies to the multiple fragments.

At 604, a set of search results may be obtained based at least in part on executing the query against a knowledge base. The knowledge base may be online (e.g., a knowledge base of a publicly available search engine, etc.), local to the computing device 102, or accessible to the computing device 102 (e.g., via a wired or wireless connection).

At 605, a set of candidate sentence fragments for the missing one or more sentence fragments may be obtained from a search result (or more than one search result) of the set of search results. The process for identifying the particular search result from which candidate sentence fragments are obtained is described in more detail in FIG. 2.

At 606, a subset of sentence fragments may be identified (e.g., selected) from the set of candidate sentence fragments based at least in part on comparing the sentence fragments of the discourse tree to the set of candidate sentence fragments obtained from the search result. That is, a subset of sentence fragments of the candidate sentence fragments may be identified by removing (or otherwise disregarding) candidate sentence fragments that correspond to fragments of the discourse tree generated for the input text.

At 607, one or more operations may be performed (e.g., by the processing module 120 of FIG. 1) based at least in part on identifying the subset of sentence fragments. The subset of sentence fragments identified may be considered natural language expressions that are implied but excluded from the input text. These may be provided to the user as output (e.g., to continue dialog, to gain more information from the user, etc.).

Exemplary Computing Systems

Figure 7:
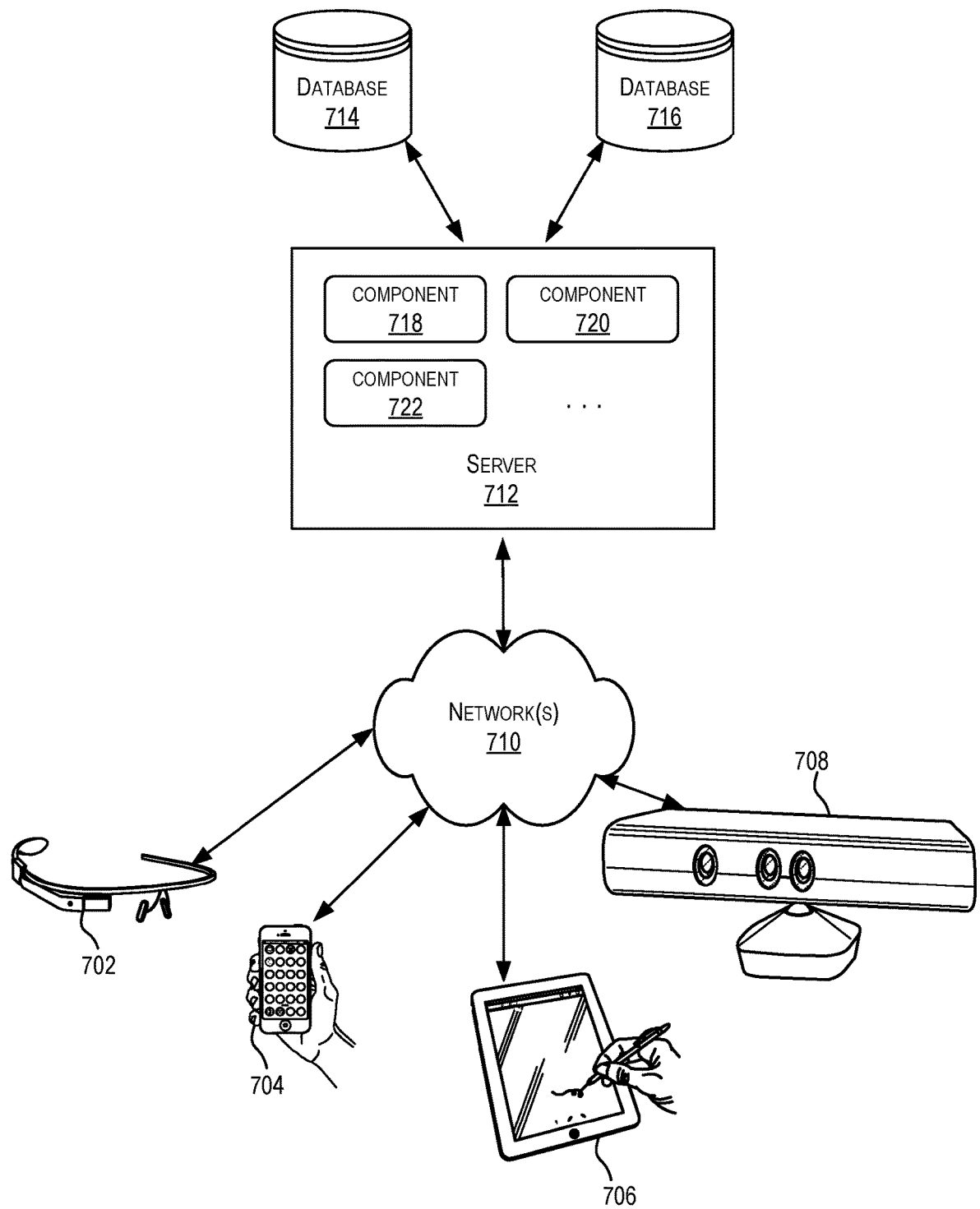
FIG. 7 depicts a simplified diagram of a distributed system for implementing one of the aspects, in accordance with at least one embodiment.

FIG. 7 depicts a simplified diagram of a distributed system 700 for implementing one of the aspects. In the illustrated aspect, distributed system 700 includes one or more client computing devices 702, 704, 706, and 708, which are configured to execute and operate a client application such as a web browser, proprietary client (e.g., Oracle Forms), or the like over one or more network(s) 710. Server 712 may be communicatively coupled with remote client computing devices 702, 704, 706, and 708 via network 710.

In various aspects, server 712 may be adapted to run one or more services or software applications provided by one or more of the components of the system. The services or software applications can include non-virtual and virtual environments. Virtual environments can include those used for virtual events, tradeshows, simulators, classrooms, shopping exchanges, and enterprises, whether two- or three-dimensional (3D) representations, page-based logical environments, or otherwise. In some aspects, these services may be offered as web-based or cloud services or under a Software as a Service (SaaS) model to the users of client computing devices 702, 704, 706, and/or 708. Users operating client computing devices 702, 704, 706, and/or 708 may in turn utilize one or more client applications to interact with server 712 to utilize the services provided by these components.

In the configuration depicted in the figure, the software components 718, 720 and 722 of distributed system 700 are shown as being implemented on server 712. In other aspects, one or more of the components of distributed system 700 and/or the services provided by these components may also be implemented by one or more of the client computing devices 702, 704, 706, and/or 708. Users operating the client computing devices may then utilize one or more client applications to use the services provided by these components. These components may be implemented in hardware, firmware, software, or combinations thereof. It should be appreciated that various different system configurations are possible, which may be different from distributed system 700. The aspect shown in the figure is thus one example of a distributed system for implementing an aspect system and is not intended to be limiting.

Client computing devices 702, 704, 706, and/or 708 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including, without limitation, the variety of GNU/Linux operating systems, such as for example, Google Chrome OS. Alternatively, or in addition, client computing devices 702, 704, 706, and 708 may be any other electronic device, such as a thin-client computer, an Internet-enabled gaming system (e.g., a Microsoft Xbox gaming console with or without a Kinect® gesture input device), and/or a personal messaging device, capable of communicating over network(s) 710.

Although exemplary distributed system 700 is shown with four client computing devices, any number of client computing devices may be supported. Other devices, such as devices with sensors, etc., may interact with server 712.

Network(s) 710 in distributed system 700 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 710 can be a local area network (LAN), such as one based on Ethernet, Token-Ring and/or the like. Network(s) 710 can be a wide-area network and the Internet. It can include a virtual network, including, without limitation, a virtual private network (VPN), an intranet, an extranet, a public switched telephone network (PSTN), an infra-red network, a wireless network (e.g., a network operating under any of the Institute of Electrical and Electronics Engineers (IEEE) 802.9 suite of protocols, Bluetooth®, and/or any other wireless protocol); and/or any combination of these and/or other networks.

Server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 712 can include one or more virtual machines running virtual operating systems, or other computing architectures involving virtualization. One or more flexible pools of logical storage devices can be virtualized to maintain virtual storage devices for the server. Virtual networks can be controlled by server 712 using software defined networking. In various aspects, server 712 may be adapted to run one or more services or software applications described in the foregoing disclosure. For example, server 712 may correspond to a server for performing processing described above according to an aspect of the present disclosure.

Server 712 may run an operating system including any of those discussed above, as well as any commercially available server operating system. Server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include, without limitation, those commercially available from Oracle, Microsoft, Sybase, IBM (International Business Machines), and the like.

In some implementations, server 712 may include one or more applications to analyze and consolidate data feeds and/or event updates received from users of client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 712 may also include one or more applications to display the data feeds and/or real-time events via one or more display devices of client computing devices 702, 704, 706, and 708.

Distributed system 700 may also include one or more databases 714 and 716. Databases 714 and 716 may reside in a variety of locations. By way of example, one or more of databases 714 and 716 may reside on a non-transitory storage medium local to (and/or resident in) server 712. Alternatively, databases 714 and 716 may be remote from server 712 and in communication with server 712 via a network-based or dedicated connection. In one set of aspects, databases 714 and 716 may reside in a storage-area network (SAN). Similarly, any necessary files for performing the functions attributed to server 712 may be stored locally on server 712 and/or remotely, as appropriate. In one set of aspects, databases 714 and 716 may include relational databases, such as databases provided by Oracle, that are adapted to store, update, and retrieve data in response to SQL-formatted commands.

Figure 8:
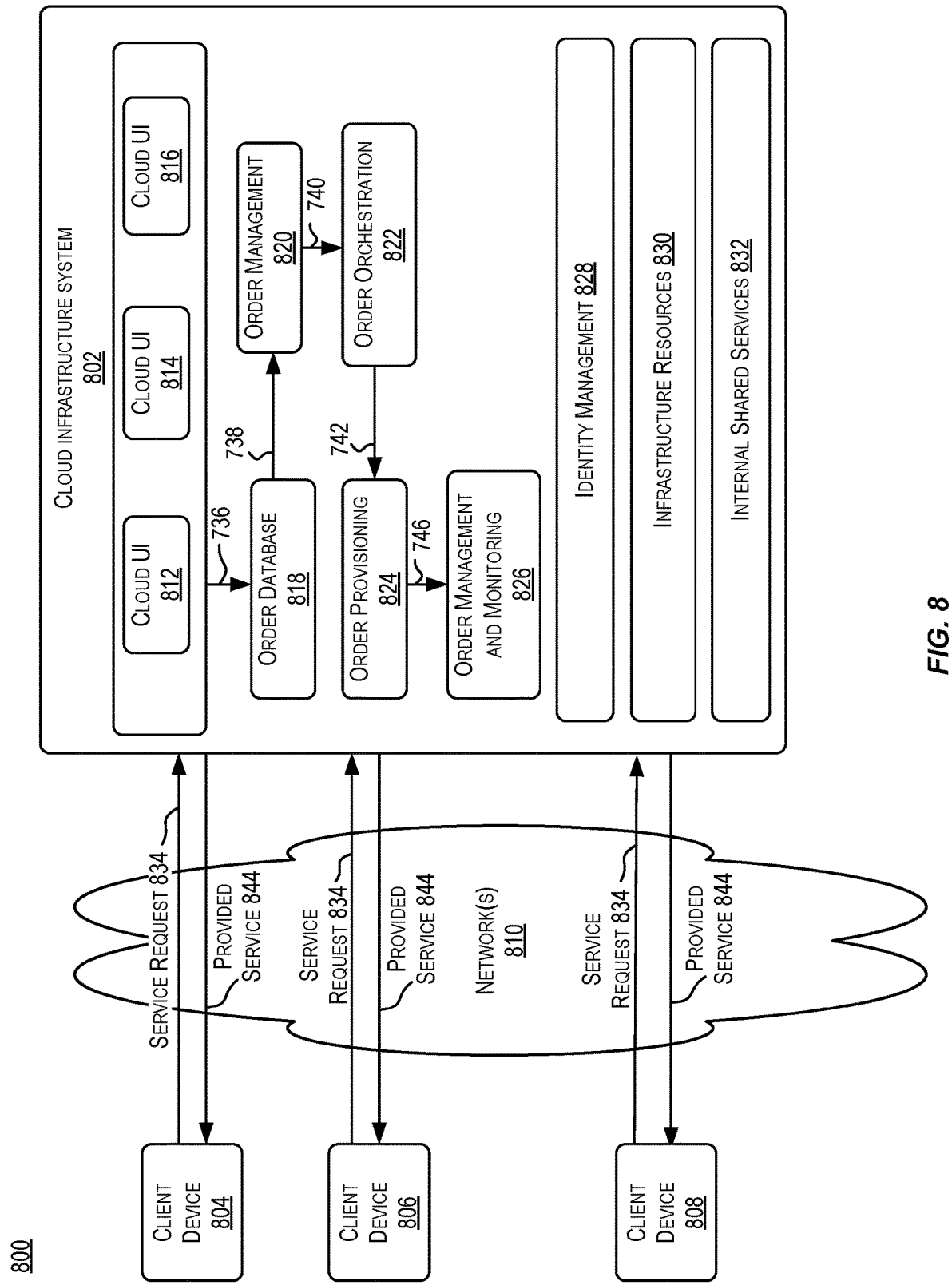
FIG. 8 is a simplified block diagram of one or more components of a system environment by which services provided by one or more components of an aspect system may be offered as cloud services, in accordance with an aspect of the present disclosure, in accordance with at least one embodiment.

FIG. 8 is a simplified block diagram of one or more components of a system environment 800 by which services provided by one or more components of an aspect system may be offered as cloud services, in accordance with an aspect of the present disclosure. In the illustrated aspect, system environment 800 includes one or more client computing devices 804, 806, and 808 that may be used by users to interact with a cloud infrastructure system 802 that provides cloud services. The client computing devices may be configured to operate a client application such as a web browser, a proprietary client application (e.g., Oracle Forms), or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the aspect shown in the figure is only one example of a cloud infrastructure system that may incorporate an aspect of the invention. In some other aspects, cloud infrastructure system 802 may have more or fewer components than shown in the figure, may combine two or more components, or may have a different configuration or arrangement of components.

Client computing devices 804, 806, and 808 may be devices similar to those described above for client computing devices 702, 704, 706, and 708.

Although exemplary system environment 800 is shown with three client computing devices, any number of client computing devices may be supported. Other devices such as devices with sensors, etc. may interact with cloud infrastructure system 802.

Network(s) 810 may facilitate communications and exchange of data between clients computing devices 804, 806, and 808 and cloud infrastructure system 802. Each network may be any type of network familiar to those skilled in the art that can support data communications using any of a variety of commercially-available protocols, including those described above for network(s) 810.

Cloud infrastructure system 802 may comprise one or more computers and/or servers that may include those described above for server 812.

In certain aspects, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain aspects, cloud infrastructure system 802 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Large volumes of data, sometimes referred to as big data, can be hosted and/or manipulated by the infrastructure system on many levels and at different scales. Such data can include data sets that are so large and complex that it can be difficult to process using typical database management tools or traditional data processing applications. For example, terabytes of data may be difficult to store, retrieve, and process using personal computers or their rack-based counterparts. Such sizes of data can be difficult to work with using most current relational database management systems and desktop statistics and visualization packages. They can require massively parallel processing software running thousands of server computers, beyond the structure of commonly used software tools, to capture, curate, manage, and process the data within a tolerable elapsed time.

Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an aspect to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various aspects, cloud infrastructure system 802 may be adapted to automatically provision, manage and track a customer's subscription to services offered by cloud infrastructure system 802. Cloud infrastructure system 802 may provide the cloud services via different deployment models. For example, services may be provided under a public cloud model in which cloud infrastructure system 802 is owned by an organization selling cloud services (e.g., owned by Oracle) and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some aspects, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some aspects, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some aspects, platform services may be provided by the cloud infrastructure system via a PaaS platform. The PaaS platform may be configured to provide cloud services that fall under the PaaS category. Examples of platform services may include, without limitation, services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some aspects, platform services provided by the cloud infrastructure system may include database cloud services, middleware cloud services (e.g., Oracle Fusion Middleware services), and Java cloud services. In one aspect, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain aspects, cloud infrastructure system 802 may also include infrastructure resources 830 for providing the resources used to provide various services to customers of the cloud infrastructure system. In one aspect, infrastructure resources 830 may include pre-integrated and optimized combinations of hardware, such as servers, storage, and networking resources to execute the services provided by the PaaS platform and the SaaS platform.

In some aspects, resources in cloud infrastructure system 802 may be shared by multiple users and dynamically re-allocated per demand. Additionally, resources may be allocated to users in different time zones. For example, cloud infrastructure system 802 may enable a first set of users in a first time zone to utilize resources of the cloud infrastructure system for a specified number of hours and then enable the re-allocation of the same resources to another set of users located in a different time zone, thereby maximizing the utilization of resources.

In certain aspects, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain aspects, cloud infrastructure system 802 may provide comprehensive management of cloud services (e.g., SaaS, PaaS, and IaaS services) in the cloud infrastructure system. In one aspect, cloud management functionality may include capabilities for provisioning, managing and tracking a customer's subscription received by cloud infrastructure system 802, and the like.

In one aspect, as depicted in the figure, cloud management functionality may be provided by one or more modules, such as an order management module 820, an order orchestration module 822, an order provisioning module 811, an order management and monitoring module 810, and an identity management module 828. These modules may include or be provided using one or more computers and/or servers, which may be general purpose computers, specialized server computers, server farms, server clusters, or any other appropriate arrangement and/or combination.

In exemplary operation 834, a customer using a client device, such as client computing device 804, 806 or 808, may interact with cloud infrastructure system 802 by requesting one or more services provided by cloud infrastructure system 802 and placing an order for a subscription for one or more services offered by cloud infrastructure system 802. In certain aspects, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 in which the customer intends to subscribe.

After an order has been placed by the customer, the order information is received via the cloud UIs, 810, 814 and/or 816.

At operation 836, the order is stored in order database 818. Order database 818 can be one of several databases operated by cloud infrastructure system 802 and operated in conjunction with other system elements.

At operation 838, the order information is forwarded to an order management module 820. In some instances, order management module 820 may be configured to perform billing and accounting functions related to the order, such as verifying the order, and upon verification, booking the order.

At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 811.

In certain aspects, order orchestration module 822 enables the management of business processes associated with each order and applies business logic to determine whether an order should proceed to provisioning. At operation 842, upon receiving an order for a new subscription, order orchestration module 822 sends a request to order provisioning module 811 to allocate resources and configure those resources needed to fulfill the subscription order. Order provisioning module 811 enables the allocation of resources for the services ordered by the customer. Order provisioning module 811 provides a level of abstraction between the cloud services provided by cloud infrastructure system 802 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client computing devices 804, 806 and/or 808 by order provisioning module 811 of cloud infrastructure system 802.

At operation 846, the customer's subscription order may be managed and tracked by an order management and monitoring module 810. In some instances, order management and monitoring module 810 may be configured to collect usage statistics for the services in the subscription order, such as the amount of storage used, the amount data transferred, the number of users, and the amount of system up time and system down time.

In certain aspects, cloud infrastructure system 802 may include an identity management module 828. Identity management module 828 may be configured to provide identity services, such as access management and authorization services in cloud infrastructure system 802. In some aspects, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.). Identity management module 828 may also include the management of descriptive information about each customer and about how and by whom that descriptive information can be accessed and modified.

Figure 9:
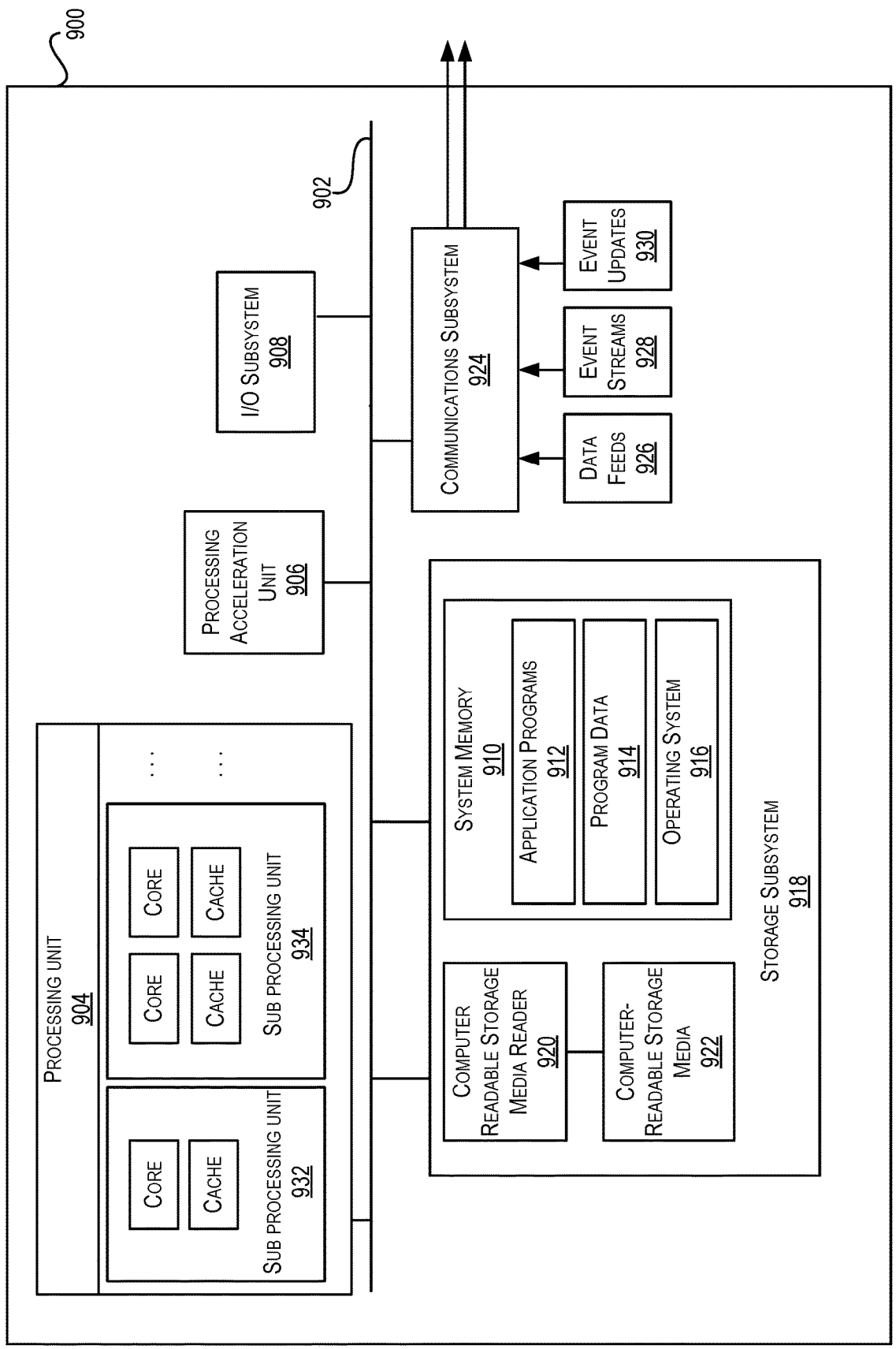
FIG. 9 illustrates an exemplary computing subsystem, in which various aspects may be implemented, in accordance with at least one embodiment.

FIG. 9 illustrates an exemplary computing subsystem 900, in which various aspects may be implemented. The computing subsystem 900 may be used to implement any of the computing subsystems described above. As shown in the figure, computing subsystem 900 includes a processing unit 904 that communicates with a number of peripheral subsystems via a bus subsystem 902. These peripheral subsystems may include a processing acceleration unit 906, an I/O subsystem 908, a storage subsystem 918 and a communications subsystem 911. Storage subsystem 918 includes tangible computer-readable storage media 909 and a system memory 910.

Bus subsystem 902 provides a mechanism for letting the various components and subsystems of computing subsystem 900 communicate with each other as intended. Although bus subsystem 902 is shown schematically as a single bus, alternative aspects of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1186.1 standard.

Processing unit 904, which can be implemented as one or more integrated circuits (e.g., a conventional microprocessor or microcontroller), controls the operation of computing subsystem 900. One or more processors may be included in processing unit 904. These processors may include single-core or multicore processors. In certain aspects, processing unit 904 may be implemented as one or more independent processing units 932 and/or 934 with single or multicore processors included in each processing unit. In other aspects, processing unit 904 may also be implemented as a quad-core processing unit formed by integrating two dual-core processors into a single chip.

In various aspects, processing unit 904 can execute a variety of programs in response to program code and can maintain multiple concurrently executing programs or processes. At any given time, some or all of the program code to be executed can be resident in processing unit(s) 904 and/or in storage subsystem 918. Through suitable programming, processing unit(s) 904 can provide various functionalities described above. Computing subsystem 900 may additionally include a processing acceleration unit 906, which can include a digital signal processor (DSP), a special-purpose processor, and/or the like.

I/O subsystem 908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computing subsystem 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computing subsystem 900 may comprise a storage subsystem 918 that comprises software elements, shown as being currently located within a system memory 910. System memory 910 may store program instructions that are loadable and executable on processing unit 904, as well as data generated during the execution of these programs.

Depending on the configuration and type of computing subsystem 900, system memory 910 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 904. In some implementations, system memory 910 may include multiple different types of memory, such as static random access memory (SRAM) or dynamic random access memory (DRAM). In some implementations, a basic input/output system (BIOS), containing the basic routines that help to transfer information between elements within computing subsystem 900, such as during start-up, may typically be stored in the ROM. By way of example, and not limitation, system memory 910 also illustrates application programs 912, which may include client applications, Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 918 may also provide a tangible computer-readable storage medium for storing the basic programming and data constructs that provide the functionality of some aspects. Software (programs, code modules, instructions) that when executed by a processor, provides the functionality described above and may be stored in storage subsystem 918. These software modules or instructions may be executed by processing unit 904. Storage subsystem 918 may also provide a repository for storing data used in accordance with the present invention.

Storage subsystem 918 may also include a computer-readable storage media reader 920 that can further be connected to computer-readable storage media 909. Together and, optionally, in combination with system memory 910, computer-readable storage media 909 may comprehensively represent remote, local, fixed, and/or removable storage devices plus storage media for temporarily and/or more permanently containing, storing, transmitting, and retrieving computer-readable information.

Computer-readable storage media 909 containing code, or portions of code, can also include any appropriate media known or used in the art, including storage media and communication media, such as, but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computing subsystem 900.

By way of example, computer-readable storage media 909 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 909 may include, but is not limited to, Zip® drives, flash memory cards, universal serial bus (USB) flash drives, secure digital (SD) cards, DVD disks, digital video tape, and the like. Computer-readable storage media 909 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computing subsystem 900.

Communications subsystem 911 provides an interface to other computing subsystems and networks. Communications subsystem 911 serves as an interface for receiving data from and transmitting data to other systems from computing subsystem 900. For example, communications subsystem 911 may enable computing subsystem 900 to connect to one or more devices via the Internet. In some aspects, communications subsystem 911 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 902.9 family standards, or other mobile communication technologies, or any combination thereof), global positioning system (GPS) receiver components, and/or other components. In some aspects, communications subsystem 911 can provide wired network connectivity (e.g., Ethernet) in addition to or instead of a wireless interface.

In some aspects, communications subsystem 911 may also receive input communication in the form of structured and/or unstructured data feeds 926, event streams 928, event updates 930, and the like on behalf of one or more users who may use computing subsystem 900.

By way of example, communications subsystem 911 may be configured to receive unstructured data feeds 926 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 911 may also be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 911 may also be configured to output the structured and/or unstructured data feeds 926, event streams 928, event updates 930, and the like to one or more databases that may be in communication with one or more streaming data source computers coupled to computing subsystem 900.

Computing subsystem 900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computing subsystem 900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various aspects.

In the foregoing specification, aspects of the invention are described with reference to specific aspects thereof, but those skilled in the art will recognize that the invention is not limited thereto. Various features and aspects of the above-described invention may be used individually or jointly. Further, aspects can be utilized in any number of environments and applications beyond those described herein without departing from the broader spirit and scope of the specification. The specification and drawings are, accordingly, to be regarded as illustrative rather than restrictive.

What is claimed is:

1. A method of identifying one or more missing natural language expressions that are implied, but missing from input text, the method comprising:
    receiving the input text comprising a plurality of sentence fragments;
    generating a discourse tree that represents rhetorical relations between the sentence fragments, the discourse tree including a plurality of nodes, each nonterminal node of the plurality of nodes representing a rhetorical relationship between two of the sentence fragments and each terminal node of the plurality of nodes being associated with one of the sentence fragments;
    identifying that the input text is likely missing one or more sentence fragments based at least in part on identifying that one or more rhetorical relationships of the discourse tree matches one of a set of predefined rhetorical relationships;
    generating a query based at least in part on a subset of the plurality of sentence fragments;
    obtaining a set of search results based at least in part on executing the query against a knowledge base;
    obtaining, from a search result of the set of search results, a set of candidate sentence fragments for the missing one or more sentence fragments;
    identifying a subset of sentence fragments from the set of candidate sentence fragments based at least in part on comparing the sentence fragments of the discourse tree to the set of candidate sentence fragments obtained from the search result; and
    performing one or more operations based at least in part on identifying the subset of sentence fragments, the subset of sentence fragments being the natural language expressions that are implied but excluded from the input text.

2. The method of claim 1, wherein the knowledge base is an online knowledge base.

3. The method of claim 1, wherein generating the query further comprises:
    identifying repetitive sentence fragments from the plurality of sentence fragments of the input text; and
    generating a generalized statement from the repetitive sentence fragments, wherein the query is generated from the generalized statement.

4. The method of claim 1, further comprising selecting the search result of the set of search results based at least in part on identifying that a relevance value between the search result and the query exceeds a predefined threshold.

5. The method of claim 1, wherein obtaining the set of candidate sentence fragments for the missing one or more sentence fragments comprises generating a respective discourse tree from the search result.

6. The method of claim 5, wherein identifying the subset of sentence fragments further comprises identifying a second predefined set of rhetorical relations and corresponding fragments of the respective discourse tree generated from the search result.

7. The method of claim 6, wherein the second predefined set of rhetorical relations comprises at least one of: attribution, condition, background, contrast, cause, or explanation.

8. A computing device, comprising:
one or more processors; and
one or more memories storing computer-executable instructions for identifying one or more missing natural language expressions that are implied, but missing from input text, that, when executed by the one or more processors, cause the computing device to:
receive the input text comprising a plurality of sentence fragments;
generate a discourse tree that represents rhetorical relations between the sentence fragments, the discourse tree including a plurality of nodes, each nonterminal node of the plurality of nodes representing a rhetorical relationship between two of the sentence fragments and each terminal node of the plurality of nodes being associated with one of the sentence fragments;
identify that the input text is likely missing one or more sentence fragments based at least in part on identifying that one or more rhetorical relationships of the discourse tree matches one of a set of predefined rhetorical relationships;
generate a query based at least in part on a subset of the plurality of sentence fragments;
obtain a set of search results based at least in part on executing the query against a knowledge base;
obtain, from a search result of the set of search results, a set of candidate sentence fragments for the missing one or more sentence fragments;
identify a subset of sentence fragments from the set of candidate sentence fragments based at least in part on comparing the sentence fragments of the discourse tree to the set of candidate sentence fragments obtained from the search result; and
perform one or more operations based at least in part on identifying the subset of sentence fragments, the subset of sentence fragments being natural language expressions that are implied but excluded from the input text.

9. The computing device of claim 8, wherein the knowledge base is an online knowledge base.

10. The computing device of claim 8, wherein executing the instructions to generate the query further causes the computing device to:
identify repetitive sentence fragments from the plurality of sentence fragments of the input text; and
generate a generalized statement from the repetitive sentence fragments, wherein the query is generated from the generalized statement.

11. The computing device of claim 8, wherein executing the instructions further causes the computing device to select the search result of the set of search results based at least in part on identifying that a relevance value between the search result and the query exceeds a predefined threshold.

12. The computing device of claim 8, wherein executing the instructions to obtain the set of candidate sentence fragments for the missing one or more sentence fragments further causes the computing device to generate a respective discourse tree from the search result.

13. The computing device of claim 12, wherein executing the instructions to identify the subset of sentence fragments further causes the computing device to identify a second predefined set of rhetorical relations and corresponding fragments of the respective discourse tree generated from the search result.

14. The computing device of claim 13, wherein the second predefined set of rhetorical relations comprises at least one of: attribution, condition, background, contrast, cause, or explanation.

15. A non-transitory computer readable medium storing instructions for identifying one or more missing natural language expressions that are implied, but missing from input text, that, when executed by one or more processors of a computing device, cause the computing device to:
receive the input text comprising a plurality of sentence fragments;
generate a discourse tree that represents rhetorical relations between the sentence fragments, the discourse tree including a plurality of nodes, each nonterminal node of the plurality of nodes representing a rhetorical relationship between two of the sentence fragments and each terminal node of the plurality of nodes being associated with one of the sentence fragments;
identify that the input text is likely missing one or more sentence fragments based at least in part on identifying that one or more rhetorical relationships of the discourse tree matches one of a set of predefined rhetorical relationships;
generate a query based at least in part on a subset of the plurality of sentence fragments;
obtain a set of search results based at least in part on executing the query against a knowledge base;
obtain, from a search result of the set of search results, a set of candidate sentence fragments for the missing one or more sentence fragments;
identify a subset of sentence fragments from the set of candidate sentence fragments based at least in part on comparing the sentence fragments of the discourse tree to the set of candidate sentence fragments obtained from the search result; and
perform one or more operations based at least in part on identifying the subset of sentence fragments, the subset of sentence fragments being natural language expressions that are implied but excluded from the input text.

16. The non-transitory computer readable medium of claim 15, wherein the knowledge base is an online knowledge base.

17. The non-transitory computer readable medium of claim 15, wherein executing the instructions to generate the query further causes the computing device to:
identify repetitive sentence fragments from the plurality of sentence fragments of the input text; and
generate a generalized statement from the repetitive sentence fragments, wherein the query is generated from the generalized statement.

18. The non-transitory computer readable medium of claim 15, wherein executing the instructions further causes the computing device to select the search result of the set of search results based at least in part on identifying that a relevance value between the search result and the query exceeds a predefined threshold.

19. The non-transitory computer readable medium of claim 18, wherein executing the instructions to obtain the set of candidate sentence fragments for the missing one or more sentence fragments further causes the computing device to generate a respective discourse tree from the search result.

20. The non-transitory computer readable medium of claim 19, wherein executing the instructions to identify the subset of sentence fragments further causes the computing device to identify a second predefined set of rhetorical relations and corresponding fragments of the respective discourse tree generated from the search result.

\* \* \* \* \*